United States Patent
Kwon et al.

(10) Patent No.: US 9,826,343 B2
(45) Date of Patent: Nov. 21, 2017

(54) METHOD AND DEVICE FOR TRANSMITTING AND RECEIVING DATA BY USING BLUETOOTH LOW ENERGY TECHNOLOGY IN WIRELESS COMMUNICATION SYSTEM

(71) Applicant: LG ELECTRONICS INC., Seoul (KR)

(72) Inventors: Younghwan Kwon, Seoul (KR); Minsoo Lee, Seoul (KR)

(73) Assignee: LG ELECTRONICS INC., Seoul (KR)

( * ) Notice: Subject to any disclaimer, the term of this patent is extended or adjusted under 35 U.S.C. 154(b) by 0 days.

(21) Appl. No.: 15/311,116

(22) PCT Filed: May 15, 2015

(86) PCT No.: PCT/KR2015/004923
§ 371 (c)(1),
(2) Date: Nov. 14, 2016

(87) PCT Pub. No.: WO2015/174793
PCT Pub. Date: Nov. 19, 2015

(65) Prior Publication Data
US 2017/0086016 A1    Mar. 23, 2017

Related U.S. Application Data

(60) Provisional application No. 61/994,104, filed on May 15, 2014.

(51) Int. Cl.
*H04W 4/00*    (2009.01)
*H04L 29/08*    (2006.01)
(Continued)

(52) U.S. Cl.
CPC ............. *H04W 4/008* (2013.01); *H04L 29/08* (2013.01); *H04W 8/005* (2013.01); *H04W 24/08* (2013.01); *H04W 24/10* (2013.01); *H04W 76/02* (2013.01)

(58) Field of Classification Search
CPC ..................................................... H04W 4/008
See application file for complete search history.

(56) References Cited

U.S. PATENT DOCUMENTS

2012/0041767 A1* 2/2012 Hoffman ............ A63B 24/0059
705/1.1
2012/0059911 A1* 3/2012 Randhawa ............ G06F 19/321
709/219

(Continued)

FOREIGN PATENT DOCUMENTS

KR    10-2014-0050355 A    4/2014
WO    WO 2012/172273 A1    12/2012
WO    WO 2014/047420 A1    3/2014

*Primary Examiner* — Cindy Trandai
(74) *Attorney, Agent, or Firm* — Birch, Stewart, Kolasch & Birch, LLP

(57) ABSTRACT

The present invention is related to a method and an apparatus for transmitting and receiving activity data of a user through Bluetooth LE (Low Energy) in a wireless communication system. A method according to the present invention comprises transmitting an advertising message indicating support of a measurement service for a user's activity to a second device; receiving a first request message requesting measurement of a specific activity of the user from the second device; transmitting a first response message to the second device in response to the first request message, when the specific activity is supported by the first device; and measuring the specific activity, wherein the first request message includes activity type indicating type of the specific activity.

13 Claims, 16 Drawing Sheets

(51) Int. Cl.
*H04W 8/00* (2009.01)
*H04W 24/08* (2009.01)
*H04W 24/10* (2009.01)
*H04W 76/02* (2009.01)

(56) References Cited

U.S. PATENT DOCUMENTS

| | | | | |
|---|---|---|---|---|
| 2012/0178471 A1* | 7/2012 | Kainulainen | ......... | G01S 5/0009 455/456.1 |
| 2013/0007499 A1* | 1/2013 | Moy | ..................... | G06F 3/1423 713/400 |
| 2013/0065584 A1* | 3/2013 | Lyon | ..................... | H04W 28/06 455/434 |
| 2013/0297711 A1* | 11/2013 | Nhu | ....................... | G06Q 50/01 709/206 |
| 2013/0303087 A1 | 11/2013 | Hauser et al. | | |
| 2013/0325396 A1* | 12/2013 | Yuen | ..................... | G01C 22/006 702/160 |
| 2014/0039841 A1* | 2/2014 | Yuen | ..................... | A61B 5/6838 702/189 |
| 2014/0089514 A1* | 3/2014 | Messenger | ............. | G06Q 30/02 709/227 |
| 2014/0106677 A1* | 4/2014 | Altman | ................ | H04B 1/3827 455/41.2 |
| 2014/0156228 A1* | 6/2014 | Molettiere | ........... | G06F 19/322 702/189 |
| 2014/0228649 A1* | 8/2014 | Rayner | ................ | A61B 5/1118 600/301 |
| 2015/0154431 A1* | 6/2015 | Skaaksrud | ............ | H04W 12/06 340/10.1 |
| 2015/0248702 A1* | 9/2015 | Chatterton | ......... | G06Q 30/0261 705/14.58 |
| 2015/0304822 A1* | 10/2015 | Han | ........................ | H04W 4/06 370/311 |
| 2015/0350355 A1* | 12/2015 | Linn | ...................... | H04L 67/22 709/217 |
| 2015/0382150 A1* | 12/2015 | Ansermet | .......... | G06Q 10/0639 455/41.1 |
| 2016/0184635 A1* | 6/2016 | Kwon | .................... | H04W 4/008 455/41.2 |

* cited by examiner

[Fig.1]
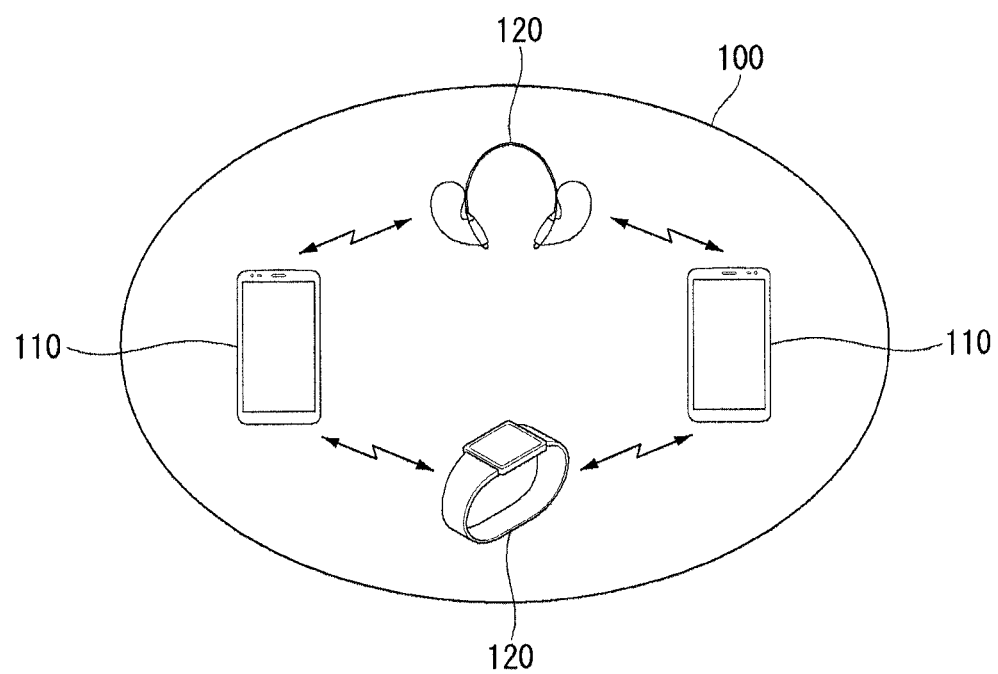

[Fig.2]
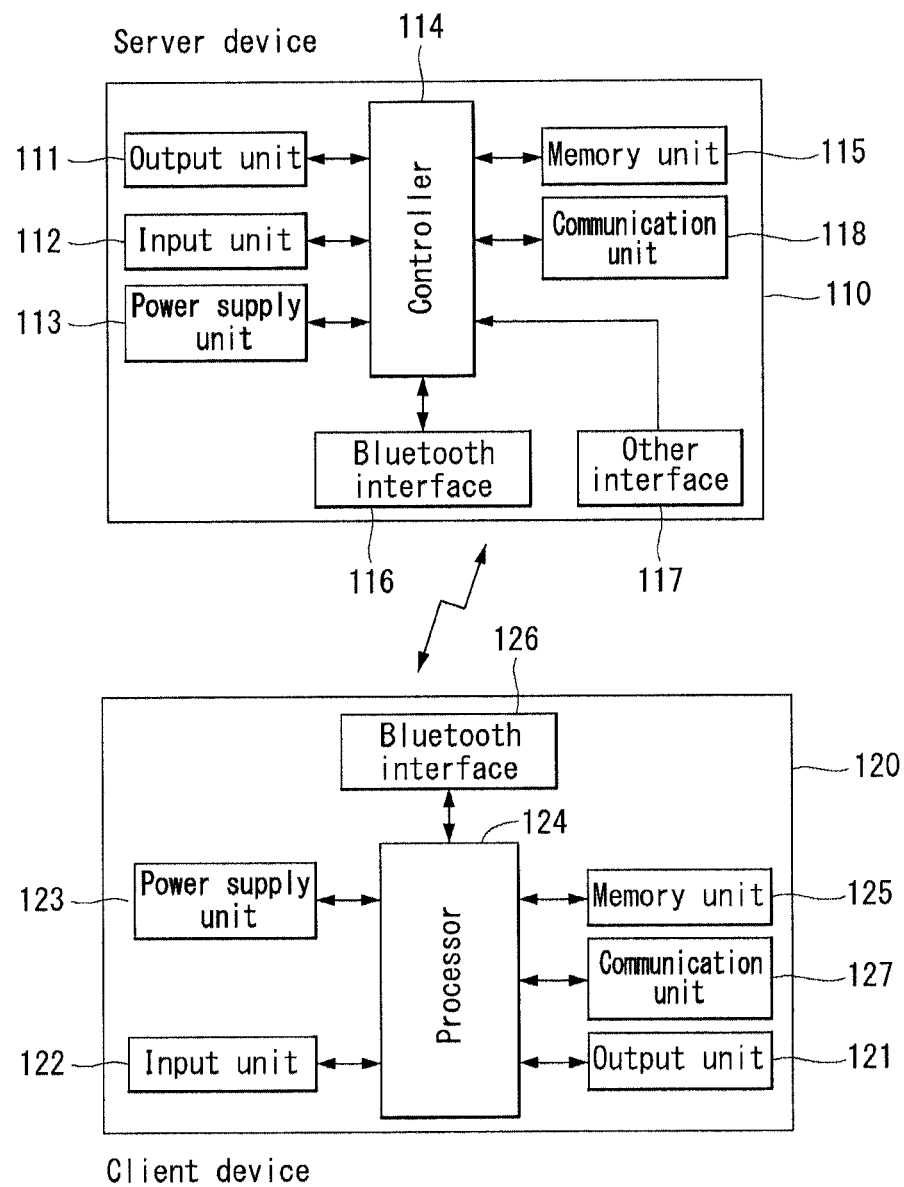

[Fig.3]
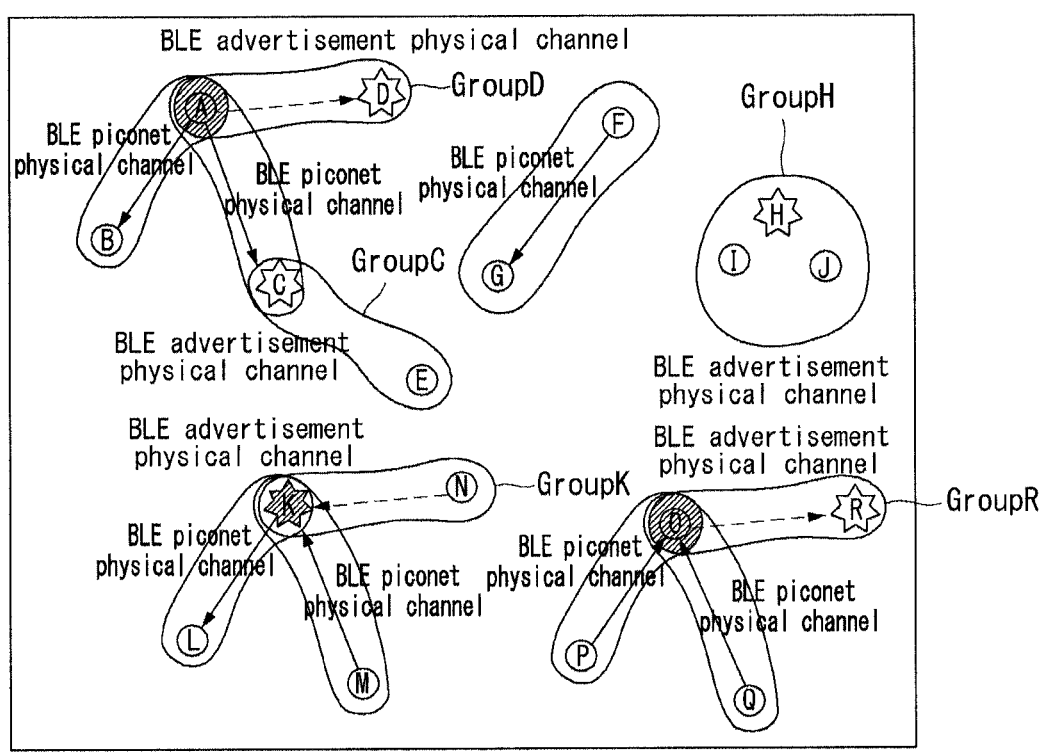

[Fig.4]
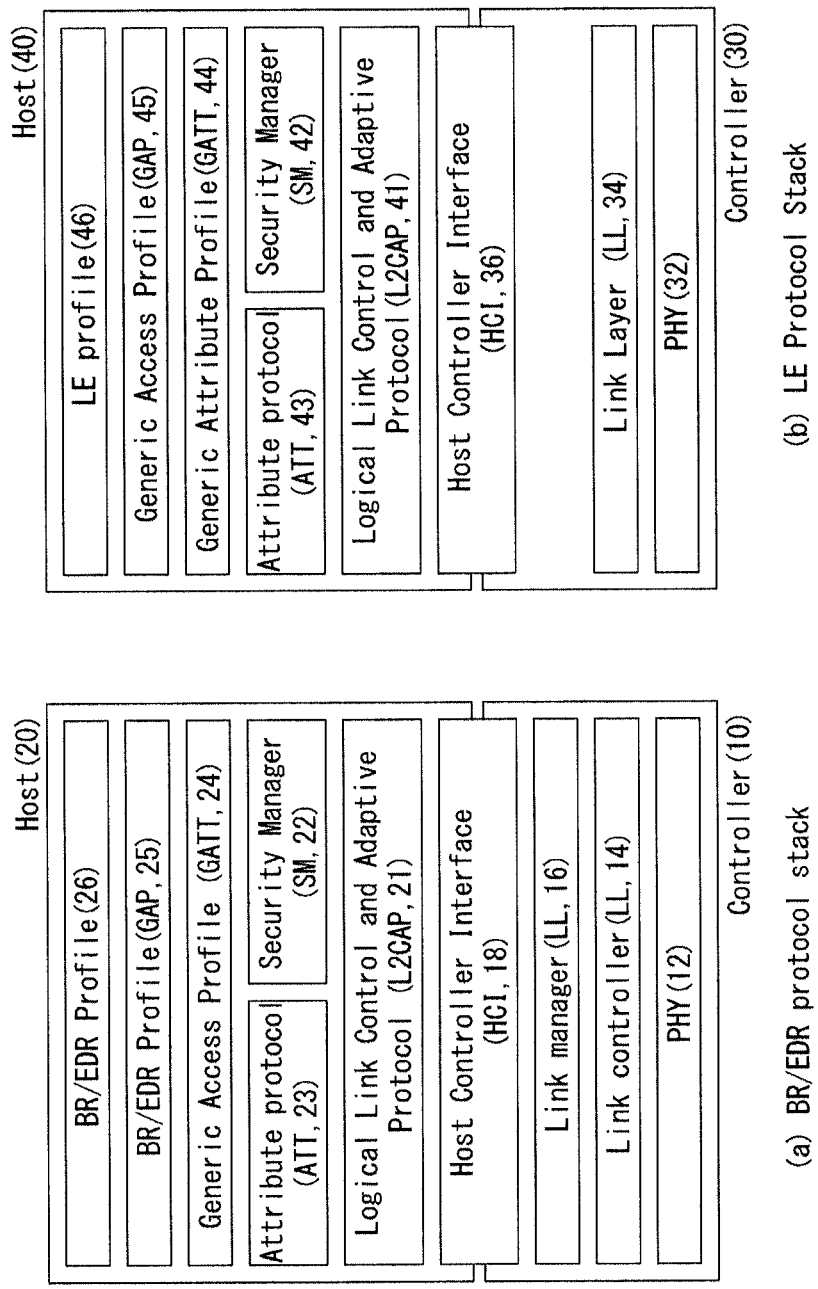

[Fig.5]
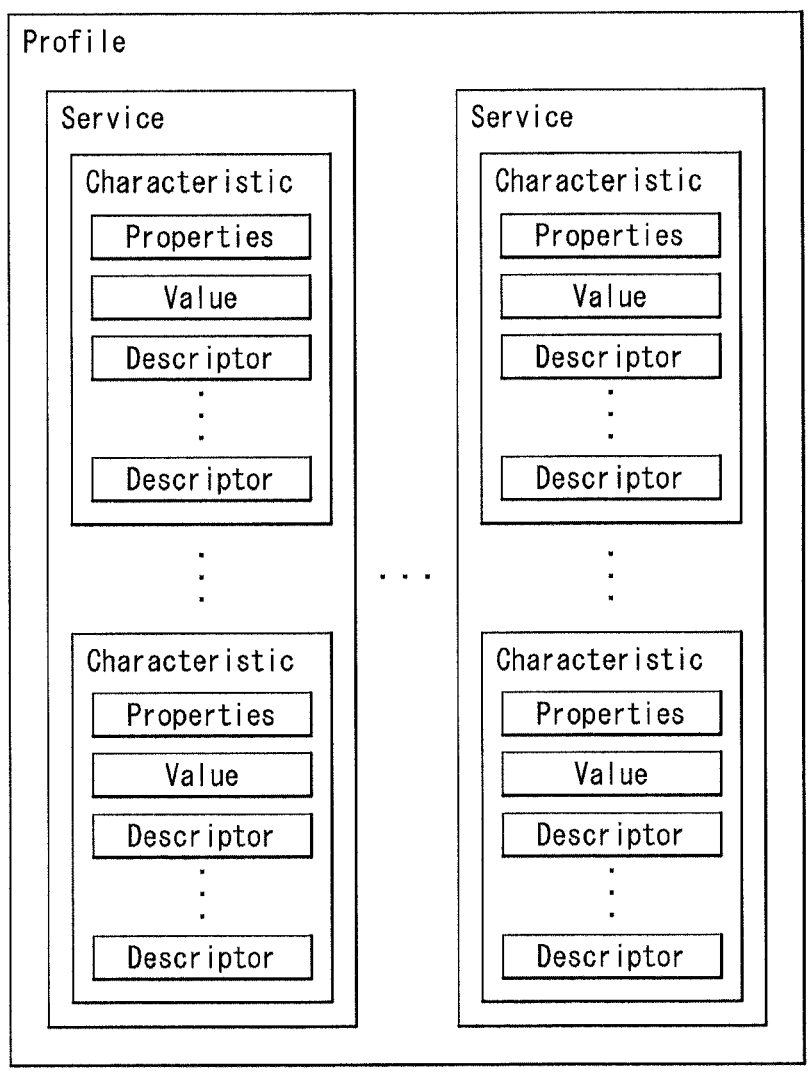

[Fig.6]
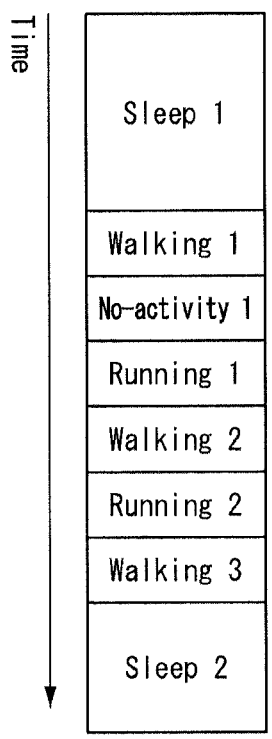

[Fig.7]
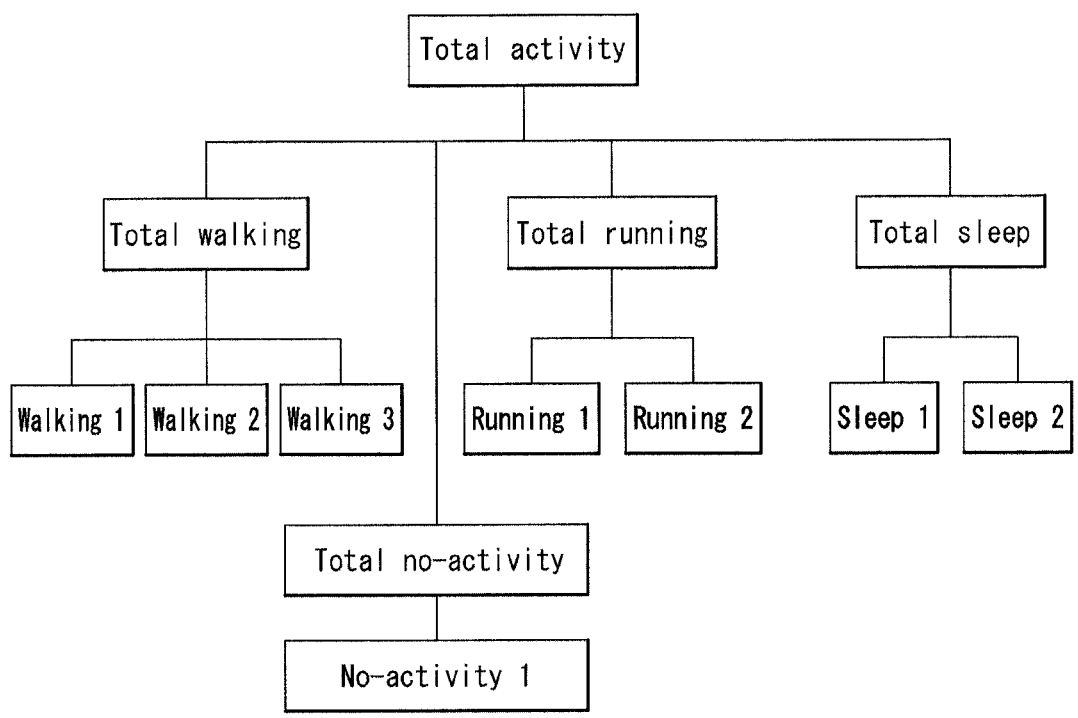

[Fig.8]
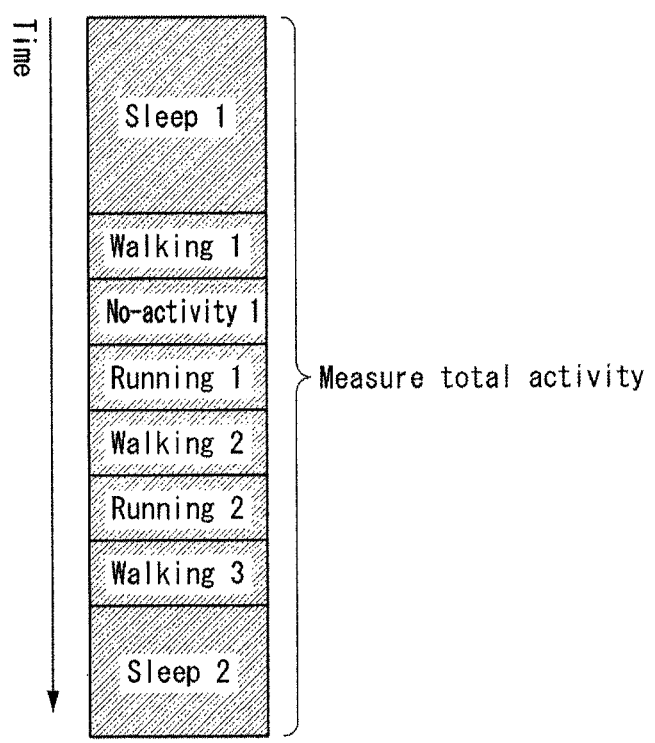

[Fig.9]
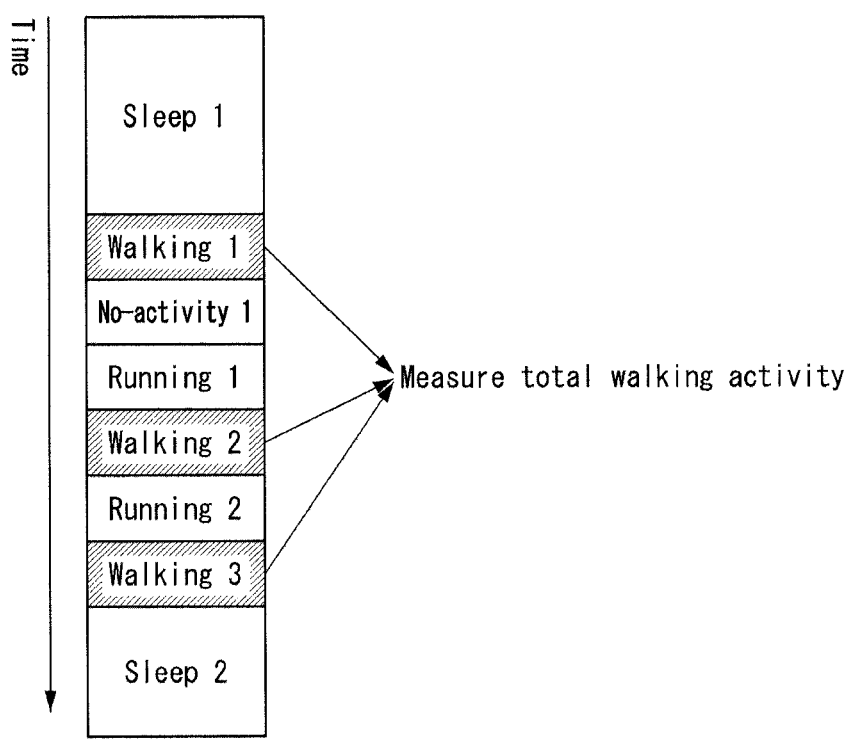

[Fig.10]
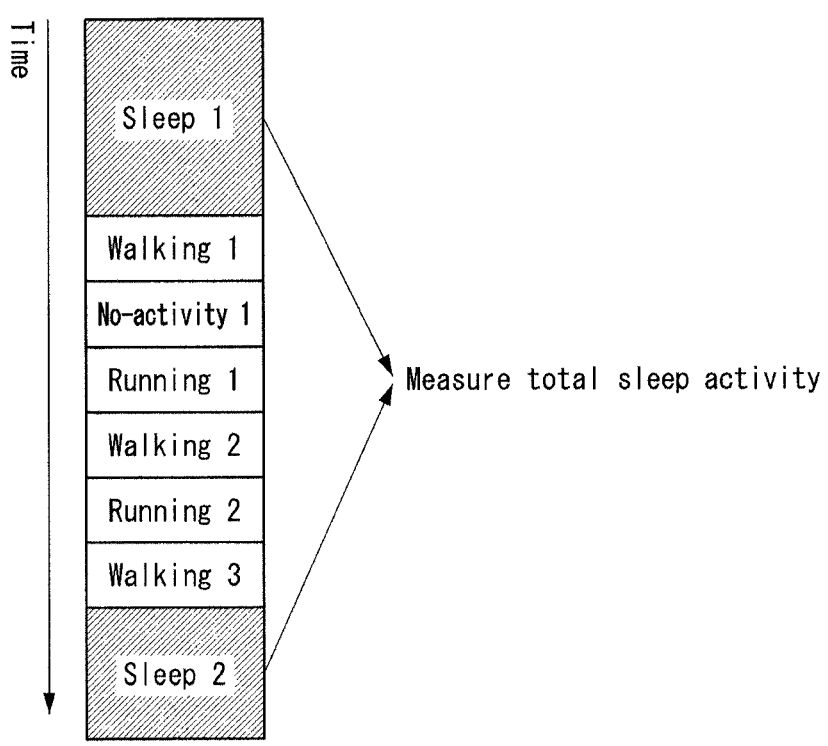

[Fig.11]
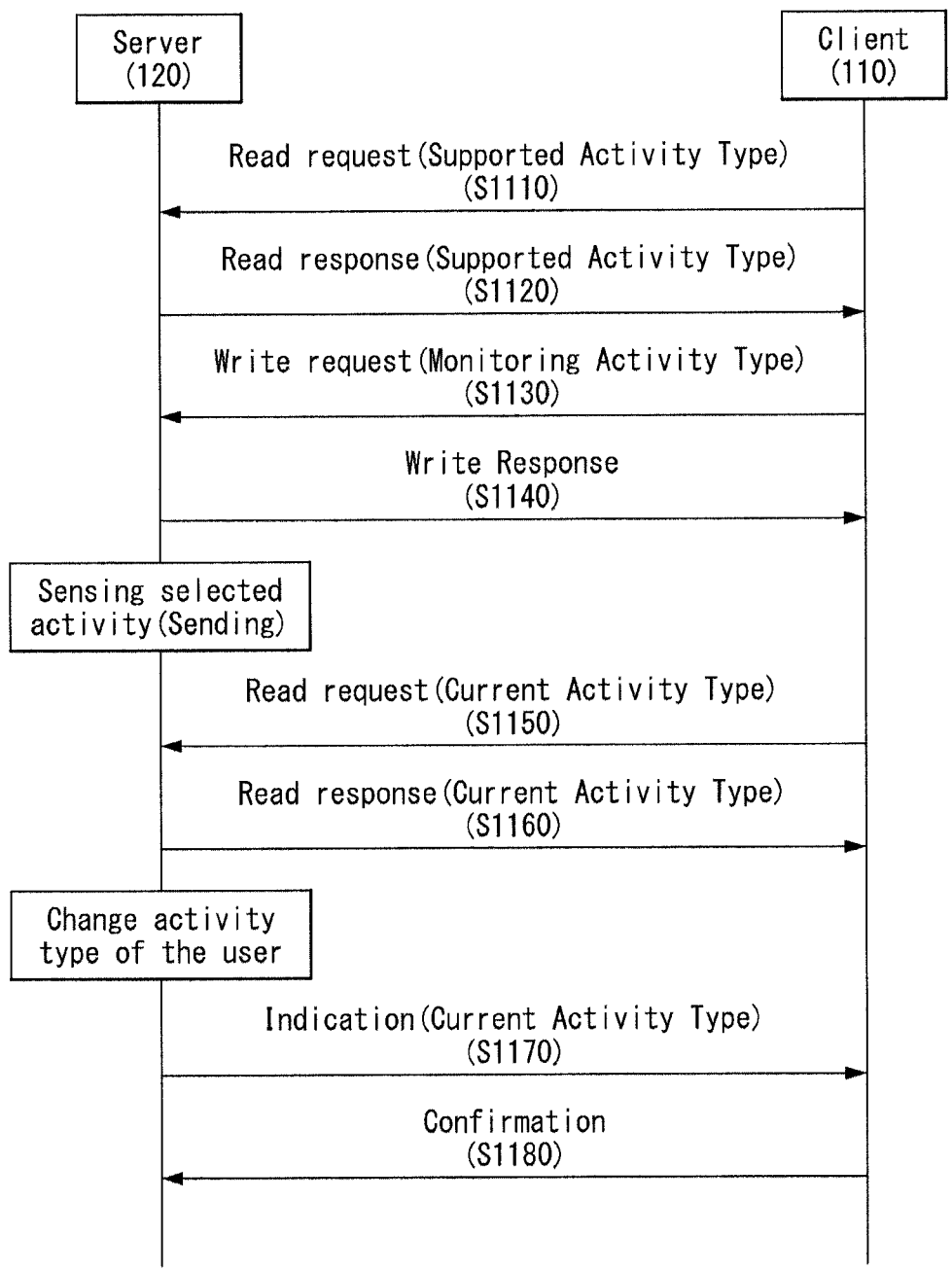

[Fig.12]
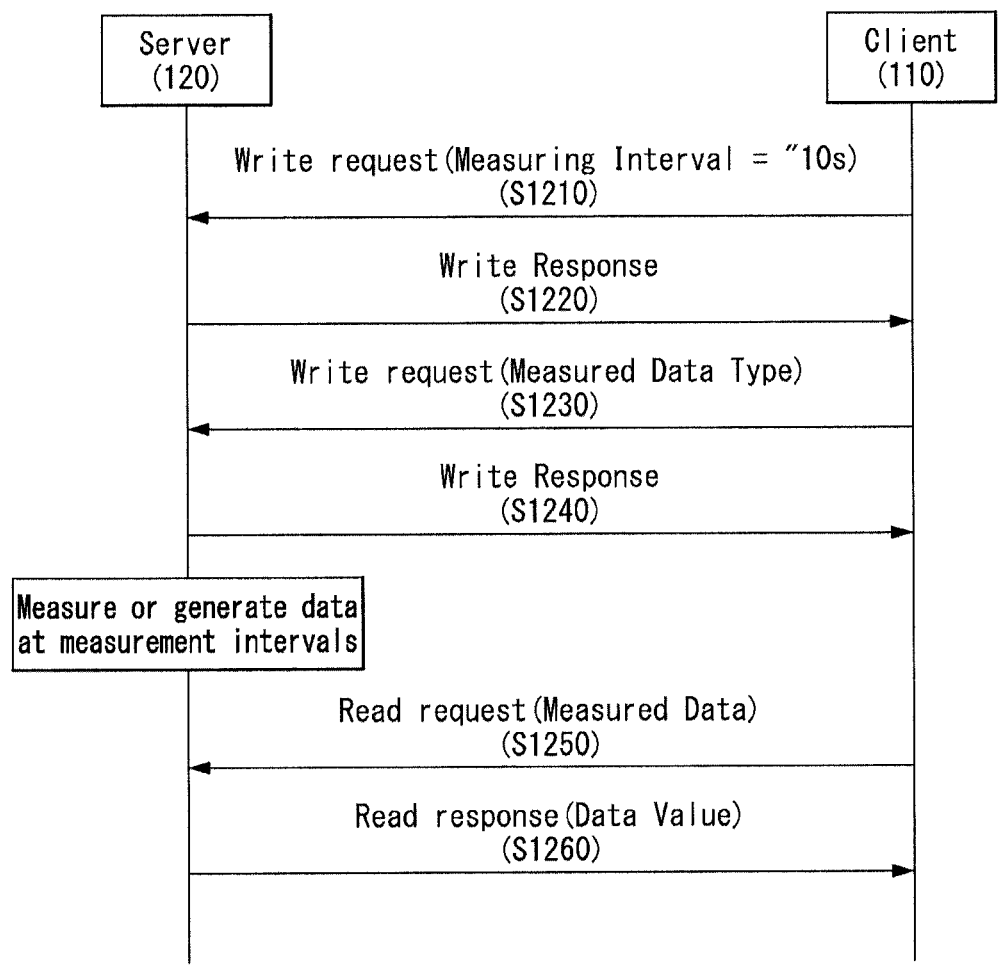

[Fig.13]
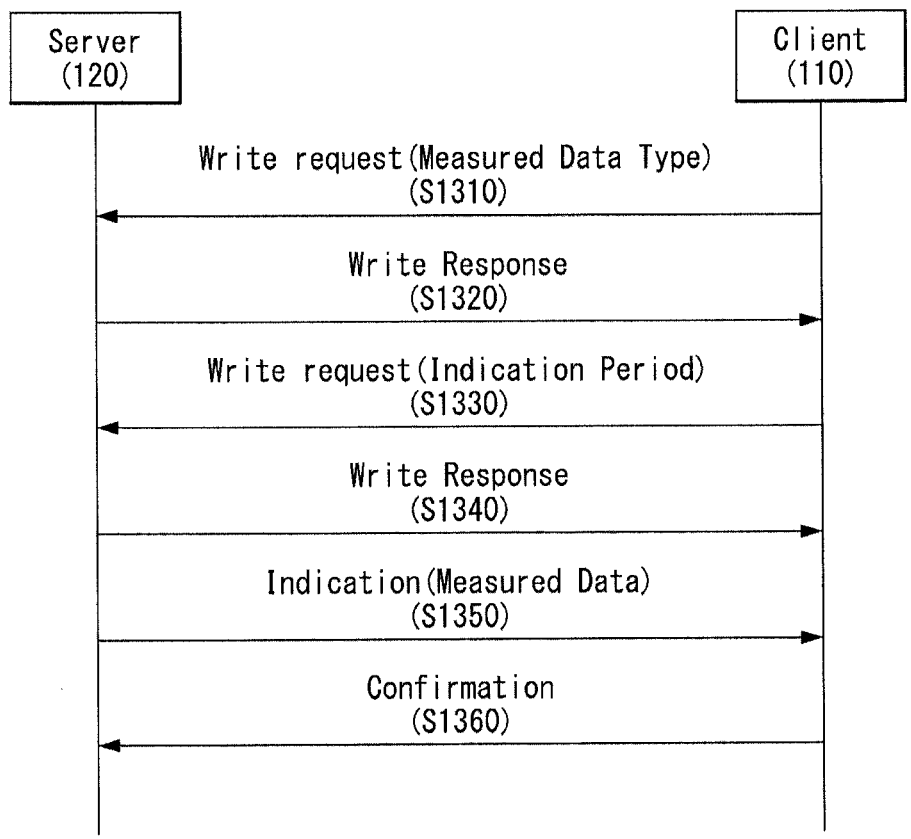
[Fig.14a]
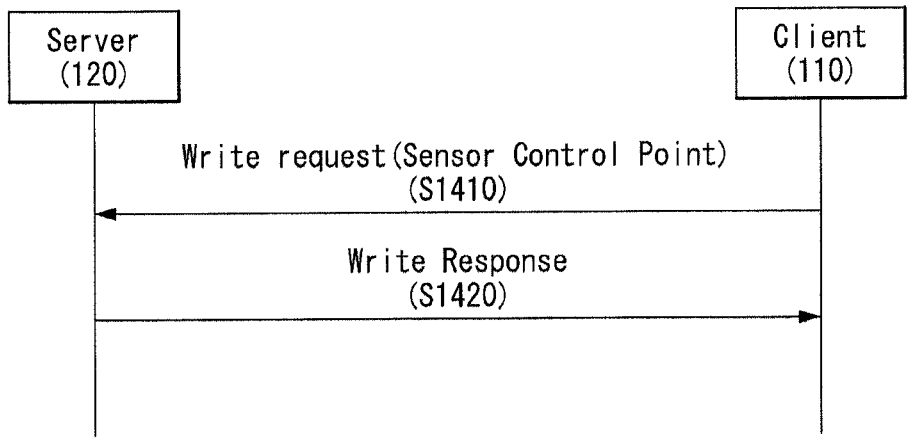

[Fig.14b]
| 0x01 | 0x02 | 0x03 | 0x04 | 0x05 | 0x06 | 0x07 | 0x08 |
|---|---|---|---|---|---|---|---|
| Activate | Deactivate | Reset | Download | Change Activity Type | Change Data Type | Change Period | Change Interval |
[Fig.15]
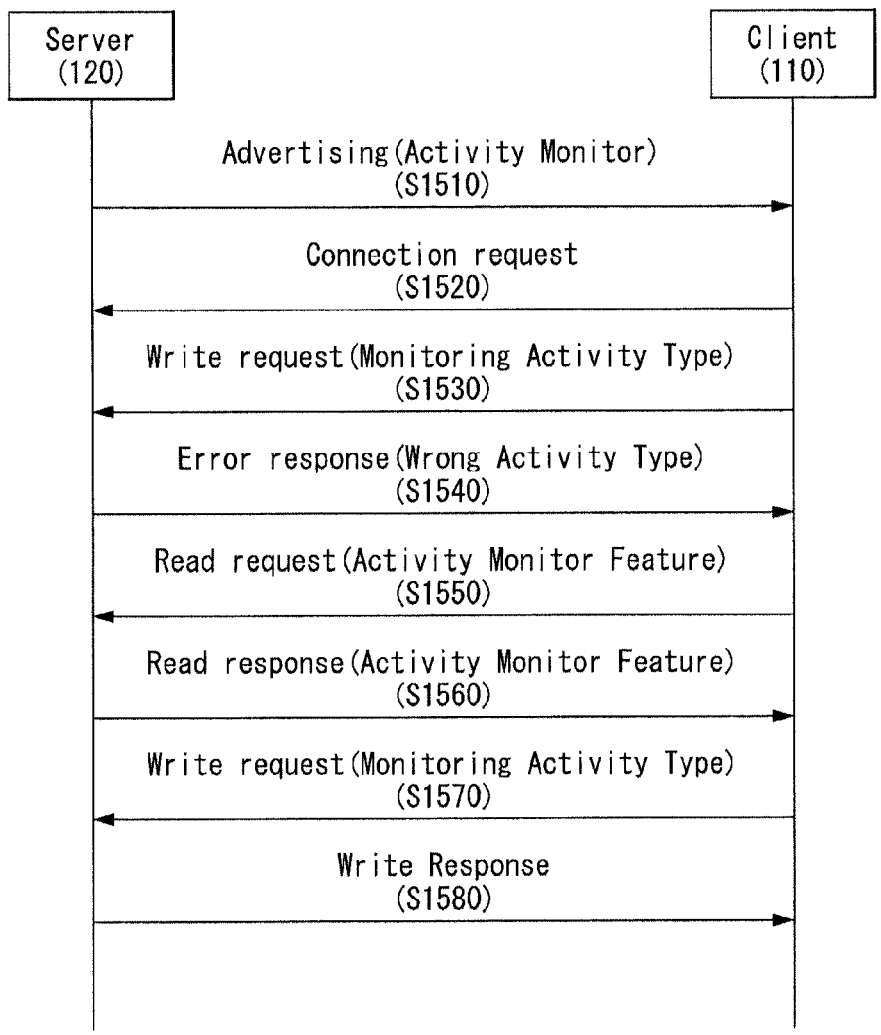

[Fig.16]
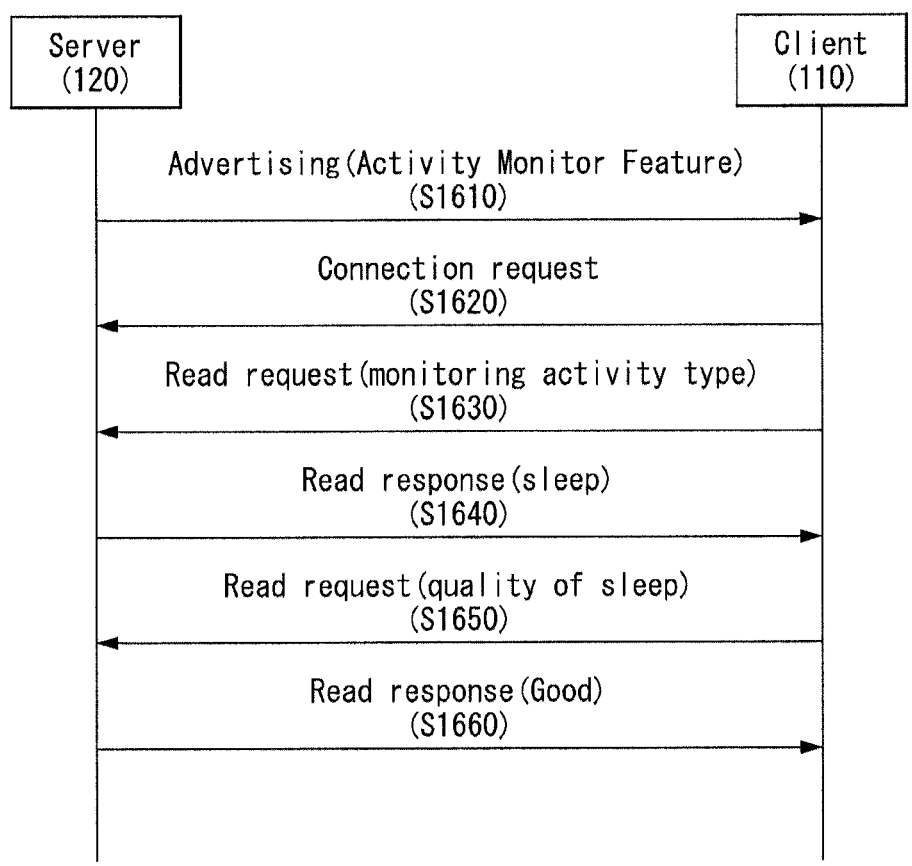

[Fig.17]
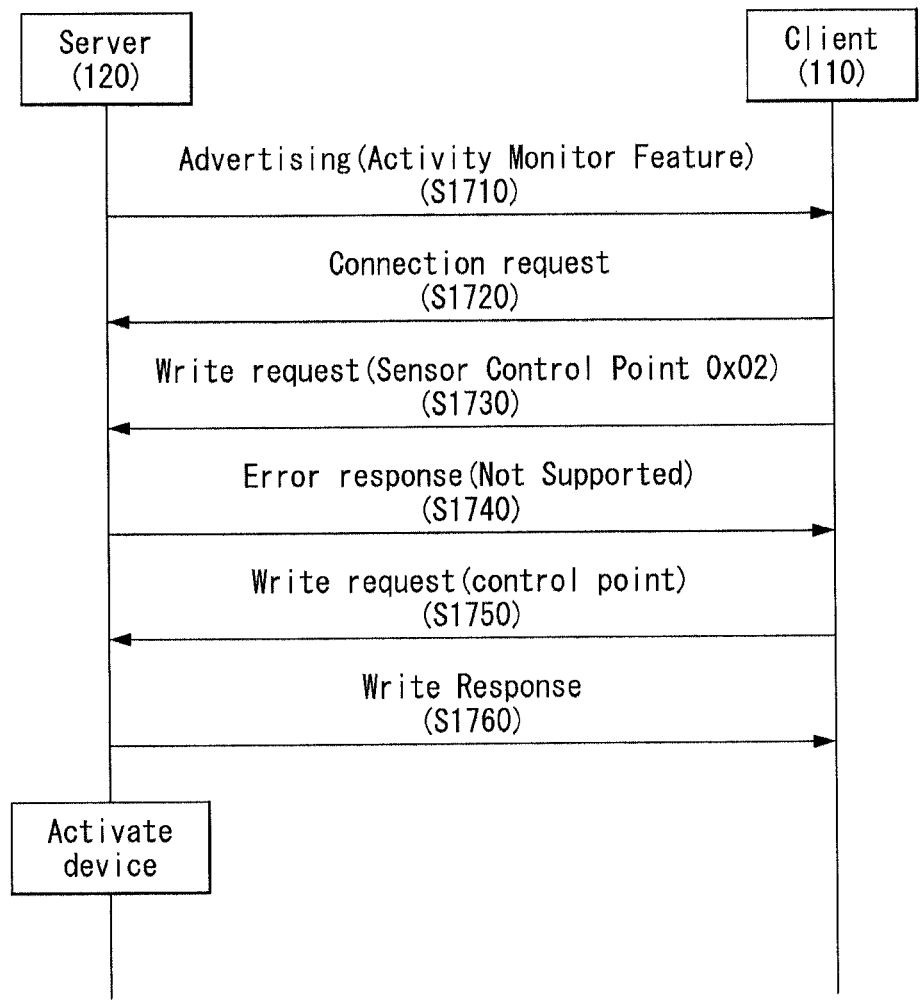

METHOD AND DEVICE FOR TRANSMITTING AND RECEIVING DATA BY USING BLUETOOTH LOW ENERGY TECHNOLOGY IN WIRELESS COMMUNICATION SYSTEM

CROSS REFERENCE TO RELATED APPLICATIONS

This application is the National Phase of PCT/KR2015/004923 filed on May 15, 2015, which claims priority under 35 U.S.C. §119(e) to U.S. Provisional Application No. 61/994,104 filed on May 15, 2014, all of which are hereby expressly incorporated by reference into the present application.

TECHNICAL FIELD

The present invention relates to a method and an apparatus for transmitting and receiving data by using Bluetooth which is a short range communication technology and more specifically, a method and an apparatus for exchanging human activity data through Bluetooth Low Energy (BLE).

BACKGROUND ART

Bluetooth is a short-range wireless technology standard that may wirelessly connect various types of devices and allows them to exchange data over short distances. To enable wireless communication between two devices using Bluetooth communication, a user has to perform the process of discovering Bluetooth devices to communicate with and making a connection request. As used herein, the term "device" refers to an appliance or equipment.

Here, the user may discover a Bluetooth device according to a Bluetooth communication method intended to be used using the Bluetooth device, and subsequently perform a connection.

The Bluetooth communication method may be classified as a BR/EDR method and an LE method. The BR/EDR method may be termed Bluetooth Classic. The Bluetooth Classic method includes a Bluetooth technology led from Bluetooth 1.0 and a Bluetooth technology using an enhanced data rate (EDR) supported by Bluetooth 2.0 or a subsequent version.

A Bluetooth low energy (LE) technology applied, starting from Bluetooth 4.0, may stably provide information of hundreds of kilobytes (KB) at low power consumption. Such a Bluetooth low energy technology allows devices to exchange information with each other by utilizing an attribute protocol. The Bluetooth LE method may reduce energy consumption by reducing overhead of a header and simplifying an operation.

Among the Bluetooth devices, some products do not have a display or a user interface. Complexity of connection, management, control, and disconnection among various types of Bluetooth devices and Bluetooth device employing similar technologies has increased.

Bluetooth supports a high speed at relatively low power consumption and at relatively low cost. However, since a transmission distance thereof is 100 m at the maximum, and thus, Bluetooth is appropriately used within a limited space.

DISCLOSURE

Technical Problem

An object of the present invention is to provide a method for transmitting and receiving data through Bluetooth communication.

Also, an object of the present invention is to provide a method for exchanging human activity data measured by a sensor through Bluetooth LE communication.

Also, an object of the present invention is to define data and parameters for a sensor to measure human activities.

Also, an object of the present invention is to define types of human activity data measured by a sensor through Bluetooth LE communication.

Also, an object of the present invention is to define a data structure by which to store human activity data measured by a sensor.

The technical objects to achieve in this document are not limited to those technical objects described above, but other technical objects not mentioned above can be clearly understood by those skilled in the art to which the present invention belongs from the specifications give below.

Technical Solution

To resolve the technical problem described above, the present invention provides a method and an apparatus for transmitting and receiving data through Bluetooth LE (Low Energy) technology.

More specifically, a method for transmitting and receiving data through Bluetooth LE (Low Energy) according to one embodiment of the present invention comprises transmitting an advertising message indicating support of a measurement service for a user's activity to a second device; receiving a first request message requesting measurement of a specific activity of the user from the second device; transmitting a first response message to the second device in response to the first request message, when the specific activity is supported by the first device; and measuring the specific activity, wherein the first request message includes activity type indicating type of the specific activity.

Also, the present invention further comprises transmitting an error message to the second device, when the specific activity is not supported by the first device; receiving from the second device a second request message requesting activity information of user supported by the first device; transmitting to the second device a second response message including the activity information of supported user in response to the second request message; receiving a third request message requesting measurement of an activity included in the activity information of the user; and transmitting a third response message in response to the third request message.

Also, the activity information of the supported user according to the present invention includes an activity type indicating type of body activity of the user and measured data type information.

Also, the data type information according to the present invention includes at least one of speed information, calorie information, time information, distance information, or activity number information indicating how many times the activity has been performed.

Also, the present invention further comprises receiving a second request message requesting a measurement value of the specific activity from the second device; and transmitting a second response message including the measurement value in response to the second request message.

Also, the present invention further comprises receiving a second request message requesting configuration of a transmission period of measurement value of the specific activity; and transmitting the measurement value to the second device for each transmission period.

Also, the present invention further comprises receiving a control message requesting a specific operation from the second device; and performing the specific operation based on the control message, wherein the specific operation is one of activation of measurement operation of the specific activity, deactivation, reset of measured data, download of measured data, change of the specific activity, change of measured data, or change of transmission period.

Also, the present invention further comprises receiving a connection request message from the second device based on the advertising message; and establishing a Bluetooth LE connection with the second device.

Also, the present invention comprises transmitting an advertising message including activity information of supported user to a second device; receiving a first request message requesting activity type information being measured from the second device; transmitting a first response message including the activity type information being measured to the second device based on the first request message; receiving a second request message requesting specific data of activity type being measured from the second device; and transmitting a second response message including the specific data to the second device in response to the second request message, wherein the activity information includes activity type indicating type of body activity of the user and measured data type information.

Also, the present invention further comprises receiving a control message requesting a specific operation from the second device; and performing the specific operation based on the control message, wherein the specific operation is one of activation of measurement operation of the specific activity, deactivation, reset of measured data, download of measured data, change of the specific activity, change of measured data, or change of transmission period.

Also, the present invention further comprises receiving a connection request message from the second device based on the advertising message; and establishing a Bluetooth LE connection with the second device.

Also, the data type information according to the present invention includes at least one of speed information, calorie information, time information, distance information, or activity number information indicating how many times the activity has been performed.

Also, a device according to the present invention comprises a communication unit for communicating with the outside in a wireless or wired manner; and a processor functionally connected to the communication unit, wherein the processor is configured to transmit an advertising message indicating support of a measurement service for a user's activity to a second device; receive a first request message requesting measurement of a specific activity of the user from the second device; transmit a first response message to the second device in response to the first request message, when the specific activity is supported by the first device; and measure the specific activity, wherein the first request message includes activity type indicating type of the specific activity.

Also, a device according to the present invention comprises a communication unit for communicating with the outside in a wireless or wired manner; and a processor functionally connected to the communication unit, wherein the processor is configured to transmit an advertising message including activity information of supported user to a second device; receive a first request message requesting activity type information being measured from the second device; transmit a first response message including the activity type information being measured to the second device based on the first request message; receive a second request message requesting specific data of activity type being measured from the second device; and transmit a second response message including the specific data to the second device in response to the second request message, wherein the activity information includes activity type indicating type of body activity of the user and measured data type information.

Advantageous Effects

According to a method for transmitting and receiving data by using Bluetooth LE according to one embodiment of the present invention, human activity can be measured continuously.

Also, according to a method for transmitting and receiving data by using Bluetooth LE according to one embodiment of the present invention, different data according to human activity types can be measured.

Also, according to a method for transmitting and receiving data by using Bluetooth LE according to one embodiment of the present invention, different data according to human activity types can be provided.

Also, according to a method for transmitting and receiving data by using Bluetooth LE according to one embodiment of the present invention, measured human activity information data can be exchanged efficiently.

The advantageous effects that can be obtained from the present invention are not limited to the effects described above, but other advantageous effects not mentioned above can be clearly understood by those skilled in the art to which the present invention belongs.

BRIEF DESCRIPTION OF THE DRAWINGS

FIG. 1 illustrates one example of a wireless communication system based on Bluetooth LE according to the present invention.

FIG. 2 illustrates one example of an internal block diagram of a device in which methods according to the present invention can be implemented.

FIG. 3 illustrates one example of Bluetooth LE topology.

FIG. 4 illustrates one example of Bluetooth communication architecture to which method according to the present invention can be applied.

FIG. 5 illustrates one example of GATT profile structure of Bluetooth LE.

FIG. 6 illustrates one example of displaying human activities in a temporal order according to the present invention.

FIG. 7 illustrates one example of the overall structure of human activity data according to the present invention.

FIGS. 8 to 10 illustrate one example of data measurement according to activity of a user according to the present invention.

FIG. 11 is a flow diagram illustrating one example of a method for data measurement and exchange according to the present invention.

FIG. 12 is a flow diagram illustrating another example of a method for data measurement and exchange according to the present invention.

FIG. 13 is a flow diagram illustrating a yet another example of a method for data measurement and exchange according to the present invention.

FIG. 14 is a flow diagram illustrating one example of transmitting a control message for data measurement according to the present invention.

FIG. 15 is a flow diagram illustrating a still another example of a method for data measurement and exchange according to the present invention.

FIG. 16 is a flow diagram illustrating an additional example of a method for data measurement and exchange according to the present invention.

FIG. 17 is a flow diagram illustrating one example of a method for controlling a device through a control message according to the present invention.

MODE FOR INVENTION

The aforementioned objects, features and advantages of the present invention will become more apparent through the following detailed description with respect to the accompanying drawings. Hereinafter, the embodiments of the present invention will be described with reference to the accompanying drawings, in which like numbers refer to like elements throughout the specification. In describing the present invention, a detailed description of known techniques associated with the present invention unnecessarily obscure the gist of the present invention, it is determined that the detailed description thereof will be omitted.

Hereinafter, a terminal related to the present invention will be described in detail with reference to the accompanying drawings. In the following description, usage of suffixes such as 'module', 'part' or 'unit' used for referring to elements is given merely to facilitate explanation of the present invention, without having any significant meaning by itself.

Electronic devices in this document may include a cellular phone, smartphone, laptop computer, digital broadcasting terminal, personal digital assistants (PDA), portable multimedia player (PMP), navigation terminal, and temperature/pressure/body data sensor; however, it should be clearly understood by those skilled in the art that except for those specific cases applicable only to a mobile terminal, the structure according to the embodiments of the present invention can also be applied to fixed terminals such as a digital TV and a desktop computer.

A signal described in this document can be transmitted in the form of not only a message but also a frame. A wireless communication interface and a wireless communication means are assigned or used interchangeably by taking into account only the convenience of writing the specification of the present invention and do not have individual implications or provide individual roles that can be distinguished from each other.

FIG. 1 illustrates one example of a wireless communication system based on Bluetooth LE according to the present invention.

A wireless communication system 100 includes at least one server device 120 and at least one client device 110.

The server device and the client device perform Bluetooth communication using a Bluetooth low energy (BLE) technology.

First, compared with a Bluetooth basic rate/enhanced data rate (BR/EDR), the BLE technology has a relatively small duty cycle, may be produced at low cost, and significantly reduce power consumption through a low data rate, and thus, it may operate a year or longer when a coin cell battery is used.

Also, in the BLE technology, an inter-device connection procedure is simplified and a packet size is designed to be small compared with the Bluetooth BR/EDR technology.

In the BLE technology, (1) the number of RF channels is forty, (2) a data rate supports 1 Mbps, (3) topology has a scatternet structure, (4) latency is 3 ms, (5) a maximum current is 15 mA or lower, (6) output power is 10 mW (10 dBm) or less, and (7) the BLE technology is commonly used in applications such as a clock, sports, healthcare, sensors, device control, and the like.

The server device 120 may operate as a client device in a relationship with other device, and the client device may operate as a server device in a relationship with other device. That is, in the BLE communication system, any one device may operate as a server device or a client device, or may operate as both a server device and a client device if necessary.

The server device 120 may also be called as data service device, slave device, slave, server, conductor, host device, gateway, sensing device, monitoring device, first device, or the like, and the client device 110 may also be called as master device, master, client, member, sensor device, sink device, collector, second device, and the like.

The server device and the client device correspond to major components of the wireless communication system, and the wireless communication system may include components other than the server device and the client device.

The server device refers to a device which receives data from the client device and provides data to the client device in response when a corresponding request is received from the client device, through direct communication with the client device.

Also, in order to provide data information to the client device, the server device sends a notification message or an indication message to the client device in order to provide data information to the client device. Also, the server device receives a confirmation message corresponding to the indication message from the client device.

Also, in the process of transmitting and receiving notification, indication, and confirmation messages to and from the client device, the server device may provide data information to a user through a display unit or may receive a request input from the user through a user input interface.

Also, in the process of transmitting and receiving message to and from the client device, the server device may read data from a memory unit or may write new data to the corresponding memory unit.

Also, the single server device may be connected with a plurality of client devices, and may be easily re-connected with client devices using bonding information.

The client device 120 refers to a device which requests data information and data transmission from the server device.

The client device receives data through a notification message or an indication message from the server device, and when an indication message is received from the server device, the client device sends an acknowledgement message in response to the indication message.

Similarly, in the process of transmitting and receiving messages to and from the server device, the client device may also provide information to the user through a display unit or may receive an input from the user through a user input interface.

Also, in the process of transmitting and receiving messages with the server device, the client device may read data from a memory unit or may write new data to the corresponding memory unit.

Hardware components such as the display units, the user input interfaces, and the memory units of the server device and the client device will be described in detail with reference to FIG. 2.

Also, the wireless communication system may configure personal area networking (PAN) through the Bluetooth technology. For example, in the wireless communication system, a private piconet may be established between devices to quickly and safely exchange files, documents, and the like.

Also, although a plurality of devices already measure human body activities by using a specific device, there have been no such device transmitting measured data through Bluetooth to the user to show specific data values.

Therefore, to resolve the aforementioned problem, the present invention measures human body activities, transmits measured data through Bluetooth LE, processes the measured data, and provides the processed data to the user.

FIG. 2 illustrates one example of an internal block diagram of a device in which methods according to the present invention can be implemented.

As illustrated in FIG. 2, a server device includes a display unit 111, a user input interface 112, a power supply unit 113, a processor 114, a memory unit 115, a Bluetooth interface 116, other interface 117, and a communication unit (or transceiver unit) 118.

The display unit 111, the user input interface 112, the power supply unit 113, the processor 114, the memory unit 115, the Bluetooth interface 116, other interface 117, and the communication unit 118 are functionally connected to each other to perform a method proposed in this disclosure.

Also, the client device includes a display unit 121, a user input interface 122, a power supply unit 123, a processor 124, a memory unit 125, a Bluetooth interface 126, and a communication unit (or transceiver unit) 128.

The display unit 121, the user input interface 122, the power supply unit 123, the processor 124, the memory unit 125, the Bluetooth interface 126, other interface 127, and the communication unit 128 are functionally connected to each other to perform a method proposed in this disclosure.

The Bluetooth interfaces 116 and 126 refer to units (or modules) able to transmit data such as a request/a response, a command, a notification, an indication/confirmation message between devices.

The memory units 115 and 126 are units implemented in various types of devices, in which various types of data are stored.

The processors 114 and 124 refer to modules controlling a general operation of the server device or the client device, which control requesting transmission of a message through the Bluetooth interface and other interface and processing a received message therethrough.

The processors 114 and 124 may also be termed a controller, a control unit, and the like.

The processors 114 and 124 may include an application-specific integrated circuit (ASIC), other chip set, a logic circuit and/or data processing unit.

The processors 114 and 124 control the communication units to receive an advertising message from the server device, control the communication unit to transmit a scan request message to the server device and receive a scan response message as a response to the scan request from the server device, and control the communication unit to transmit a connection request message to the server device in order to establish a Bluetooth connection with the server device.

Also, after the Bluetooth LE connection is established through the connection procedure, the processors 114 and 124 control the communication units to read or write data by using an attribute protocol from the server device.

The memory units 115 and 125 may include a read-only memory (ROM), a random access memory (RAM), a flash memory, a memory card, a storage medium and/or other storage device.

The communication units 118 and 127 may include a baseband circuit for processing a wireless signal. When an embodiment is implemented by software, the aforementioned technique may be implemented as a module (process, function, etc.) performing the aforementioned function. The module may be stored in a memory unit and may be executed by a processor.

The memory units 115 may be present within or outside of the processors 114 and 124, and may be connected to the processors 114 and 124 through various well-known units.

The display units 111 and 121 refer to modules providing status information of the devices, message exchange information, and the like, to the user through a screen.

The power supply units 113 and 123 refer to modules receiving external power or internal power and supplying power required for operations of the respective components under the control of the controllers 114 and 124.

As described above, BLE technology uses a small duty cycle and capable of reducing power consumption considerably through low data transmission rate, by which the power supply unit can provide power required to operate individual elements even with small output power (less than 10 mw (10 dBm)).

The user input interfaces 112 and 122 refer to modules providing a user input such as a screen button to the controllers to enable the user to control an operation of the devices.

FIG. 3 illustrates one example of Bluetooth LE topology.

Referring to FIG. 3, a device A corresponds to a master in a piconet (piconet A, the shaded portion) having a device B and a device C as slaves.

Here, the piconet refers to an aggregation of devices in which any one of them is a mater and the other devices occupy a shared physical channel connected to the master device.

The BLE slave does not share a common physical channel with the master. Each of the slaves communicates with the master trough a separate physical channel. There is another piconet (piconet F) having a master device F and a slave device G.

A device K is present in a scatternet K. Here, the scatternet refers to a group of piconets connected to other piconets.

The device K is a master of a device L and a slave of a device M.

A device O is also in the scatter net O. The device O is a slave of a device P and a slave of a device Q.

As illustrated in FIG. 2, five different device groups are present.

1. Device D is an advertiser and device A is an initiator (group D).

2. Device E is a scanner and Device C is an advertiser (group C).

3. Device H is an advertiser, and devices I and J are scanners (group H).

4. Device K is also an advertiser, and device N is an initiator (group K).

5. Device R is an advertiser, and device O is an initiator (group R).

The devices A and B use a single BLE piconet physical channel.

The devices A and C use another BLE piconet physical channel.

In group D, the device D advertises using an advertisement event connectable in an advertisement physical channel, and the device A is an initiator. The device A may establish a connection with the device D and add a device to the piconet A.

In group C, the device C advertises on an advertisement physical channel by using a certain type of an advertisement event captured by the scanner device E.

The group D and the group C may use different advertisement physical channels or different times in order to avoid collision.

In the piconet F, a single physical channel is present. The devices F and G use a single BLE piconet physical channel. The device F is a master, and the device G is a slave.

In group H, a single physical channel is present. The devices H, I, and J use a single BLE advertisement physical channel. The device H is an advertiser, and the devices I and J are scanners.

In the scatternet K, the devices K and L use a single BLE piconet physical channel. The devices K and M use another BLE piconet physical channel.

In group K, the device K advertises by using an advertisement event connectable on an advertisement physical channel, and the device N is an initiator. The device N may establish a connection with the device K. Here, the device K may be a slave of two devices and a master of one device at the same time.

In the scatternet O, the devices O and P use a single BLE piconet physical channel. The devices O and Q use another BLE piconet physical channel.

In group R, the device R advertises by using an advertisement event connectable on an advertisement physical channel, and the device O is an initiator. The device O may establish a connection with the device R. Here, the device O may be a slave of two devices and a master of one device at the same time.

FIG. 4 illustrates one example of Bluetooth communication architecture to which method according to the present invention can be applied.

Referring to FIG. 4, (a) of FIG. 4 illustrates an example of a protocol stack of a Bluetooth basic rate (BR/enhanced data rate (EDR) that supports GATT (Generic Attribute Profile), and (b) of FIG. 4 illustrates an example of a protocol stack of Bluetooth low energy (LE).

In detail, as illustrated in (a) of FIG. 4, the Bluetooth BR/EDR protocol stack may include an upper controller stack 10 and a lower host stack 20 with respect to a host controller interface (HCI) 18.

The host stack (or host module) 20 refers to hardware for transmitting or receiving a Bluetooth packet to and from a wireless transceiver module receiving a Bluetooth signal of 2.4 GHz, and is connected to a Bluetooth module, the controller stack 10, to control the Bluetooth module and performs an operation.

The host stack 20 may include a BR/EDR PHY layer 12, a BR/EDR baseband layer 14, and a link manager 16.

The BR/EDR PHY layer 12 is a layer transmitting and receiving a 2.4 GHz wireless signal, and in case of using Gaussian frequency shift keying (GFSK) modulation, the BR/EDR PHY layer 12 may transmit data by hopping 79 RF channels.

The BR/EDR baseband layer 14 serves to transmit a digital signal, selects a channel sequence hopping 1400 times per second, and transmits a time slot having a length of 625 us for each channel.

The link manager layer 16 controls a general operation (link setup, control, security) of a Bluetooth connection by utilizing a link manager protocol (LMP).

The link manager layer 16 may perform the following functions.

The link manager layer 16 may perform ACL/SCO logical transport, logical link setup, and control Detach: The link manager layer 16 stops connection and informs a counterpart device about the reason for stopping connection.

The link manager layer 16 performs power control and role switch.

The link manager layer 16 performs security (authentication, pairing, encryption) function.

The host controller interface layer 18 provides an interface between the host module and the controller module to allow the host to provide a command and data to the controller and allow the controller to provide an event and data to the host.

The host stack (or host module) 20 includes a logical link control and adaptive protocol (L2CAP) 21, Security manager(sm) 22, an attribute protocol (ATT) 23, a generic attribute profile (GATT) 24, a generic access profile (GAP) 25, and a BR/EDR profile 26.

The logical link control and adaptive protocol (L2CAP) 21 may provide a two-way channels for transmitting data to a specific protocol or a profile.

The L2CAP 21 may multiplex various protocols and profiles provided from a Bluetooth higher position.

The L2CAP of the Bluetooth BR/EDR uses a dynamic channel, supports a protocol service multiplexer, retransmission, and a streaming mode, and provides segmentation and reassembly, per-channel flow control, and error control.

The generic attribute profile (GATT) 24 may operate as a protocol how the attribute protocol 23 is used in configuring services. For example, the generic attribute profile 23 may operate how ATT attributes are grouped together with services, and operate to describe features associated with services.

Thus, the GATT 24 and the ATT 23 may use features in order to describe status and services of a device and describe how the features are related and used.

The attribute protocol 23 and profiles 26 define a service profile using Bluetooth BR/EDR and application protocol for exchanging related data, and the Generic Access Profile (GAP) 25 defines a scheme by which to discover and connect a device and to provide information for the user; and provides privacy.

As illustrated in (b) of FIG. 4, the Bluetooth LE protocol stack includes a controller stack 30 operable to process a wireless device interface for which timing is important, and a host stack 40 operable to process high level data.

First, the controller stack 30 may be implemented by using a communication module that may include a Bluetooth wireless device, for example, a processor module that may include a processing device such as a microprocessor.

The host stack may be implemented as part of an OS operated on a processor module or may be implemented as instantiation of a package on the OS.

In some examples, the controller stack and the host stack may be operated or executed on the same processing device within a processor module.

The controller stack 30 includes a physical layer (PHY) 32, a link layer (LL) 34, and a host controller interface (HCI) 36.

The physical layer (PHY) (wireless transceiver module 32), a layer for transmitting and receiving a 2.4 GHz wireless signal, uses a Gaussian frequency shift keying (GFSK) modulation and a frequency hopping technique including forty RF channels.

The link layer (LL) 34 serving to transmit or receive a Bluetooth packet provides a function of generating a connection between devices after performing an advertising and scanning function using three advertising channels, and exchanging data packets of a maximum of 257 bytes through thirty-seven data channels.

The host stack may include a generic access profile (GAP) 40, a logical link control and adaptation protocol (L2CAP) 41, a security manager (SM) 42, an attribute protocol (ATT) 43), a generic attribute profile (GATT) 44, a generic attribute profile (GAP) 45, and an LE profile 46. However, the host stack 40 is not limited thereto and may include various protocols and profiles.

The host stack multiplexes various protocols and profiles provided from a Bluetooth higher position by using the L2CAP.

First, the L2CAP 41 may provide a single two-way channel for transmitting data to a specific protocol or profile.

The L2CAP 41 may operate to multiplex data between higher layer protocols, segment and reassemble packages, and manage a multicast data transmission.

Bluetooth LE uses three fixed channels (one for signaling channel, one for security manager, and one for attribute protocol).

On the other hand, BR/EDR (Basic Rate/Enhanced Data Rate) uses a dynamic channel and supports protocol service multiplexer, retransmission, and streaming mode.

The SM 42 is a protocol for certifying a device and providing a key distribution.

The ATT 43 defines a rule for accessing data of a counterpart device by a server-client structure. The ATT 43 includes six types of messages (request, response, command, notification, indication, and confirmation) as follows.

① Request and Response message: Request message is used for a client device to request specific information from a server device, and Response message is a response message to the Request message, which is transmitted from a server device to a client device.

② Command message: A message transmitted from a client device to a server device to command a specific operation, which the server device does not transmit a response with respect to the command message to the client device.

③ Notification message: It is a message transmitted from the server device to the client device in order to notify an event, or the like. The client device does not transmit a confirmation message with respect to the notification message to the server device.

④ Indication and confirmation message: It is a message transmitted from the server device to the client device in order to notify an event, or the like. Unlike the notification message, the client device transmits a confirmation message regarding the indication message to the server device.

In the present invention, when the GATT profile using the attribute protocol (ATT) 43 requests long data, a value regarding a data length is transmitted to allow a client to clearly know the data length, and a characteristic value may be received from a server by using a universal unique identifier (UUID).

The generic access profile (GAP) 45, a layer newly implemented for the Bluetooth LE technology, is used to select a role for communication between Bluetooth LED devices and to control how a multi-profile operation takes place.

Also, the generic access profile (GAP) 45 is mainly used for device discovery, connection generation, and security procedure part, defines a scheme for providing information to a user, and defines types of attributes as follows.

① Service: It defines a basic operation of a device by a combination of behaviors related to data ② Include: It defines a relationship between services ③ Characteristics: It is a data value used in a server ④ Behavior: It is a format that may be read by a computer defined by a UUID (value type).

The LE profile 46 comprises profiles having dependency on the GATT and are mostly applied to Bluetooth LE devices. For example, LE profile can include Battery, Time, FineMe, Proximity, Time, and Object Delivery Service, and specific descriptions of the GATT-based profiles are as follows.

① Battery: Battery information exchanging method

② Time: Time information exchanging method

③ FindMe: Provision of alarm service according to distance

④ Proximity: Battery information exchanging method

⑤ Time: Time information exchanging method

The generic attribute profile (GATT) 44 may operate as a protocol describing how the attribute protocol (ATT) 43 is used when services are configured. For example, the GATT 44 may operate to define how ATT attributes are grouped together with services and operate to describe features associated with services.

Thus, the GATT 44 and the ATT 43 may use features in order to describe status and services of a device and describe how the features are related and used.

Hereinafter, procedures of the Bluetooth low energy (BLE) technology will be briefly described.

The BLE procedure may be classified as a device filtering procedure, an advertising procedure, a scanning procedure, a discovering procedure, and a connecting procedure.

Device Filtering Procedure

The device filtering procedure is a method for reducing the number of devices performing a response with respect to a request, indication, notification, and the like, in the controller stack.

When requests are received from all the devices, it is not necessary to respond thereto, and thus, the controller stack may perform control to reduce the number of transmitted requests to reduce power consumption.

An advertising device or scanning device may perform the device filtering procedure to limit devices for receiving an advertising packet, a scan request or a connection request.

Here, the advertising device refers to a device transmitting an advertisement event, that is, a device performing an advertisement and is also termed an advertiser.

The scanning device refers to a device performing scanning, that is, a device transmitting a scan request.

In the BLE, in a case in which the scanning device receives some advertising packets from the advertising device, the scanning device should transmit a scan request to the advertising device.

However, in a case in which a device filtering procedure is used so a scan request transmission is not required, the scanning device may disregard the advertising packets transmitted from the advertising device.

Even in a connection request process, the device filtering procedure may be used. In a case in which device filtering is used in the connection request process, it is not necessary to transmit a response with respect to the connection request by disregarding the connection request.

Advertising Procedure

The advertising device performs an advertising procedure to perform undirected broadcast to devices within a region.

Here, the undirected broadcast is advertising toward all the devices, rather than broadcast toward a specific device, and all the devices may scan advertising to make an additional information request or a connection request.

In contrast, directed advertising may make an additional information request or a connection request by scanning advertising for only a device designated as a reception device.

The advertising procedure is used to establish a Bluetooth connection with an initiating device nearby.

Or, the advertising procedure may be used to provide periodical broadcast of user data to scanning devices performing listening in an advertising channel.

In the advertising procedure, all the advertisements (or advertisement events) are broadcast through an advertisement physical channel.

The advertising devices may receive scan requests from listening devices performing listening to obtain additional user data from advertising devices. The advertising devices transmit responses with respect to the scan requests to the devices which have transmitted the scan requests, through the same advertising physical channels as the advertising physical channels in which the scan requests have been received.

Broadcast user data sent as part of advertising packets are dynamic data, while the scan response data is generally static data.

The advertisement device may receive a connection request from an initiating device on an advertising (broadcast) physical channel. If the advertising device has used a connectable advertising event and the initiating device has not been filtered according to the device filtering procedure, the advertising device may stop advertising and enter a connected mode. The advertising device may start advertising after the connected mode.

Scanning Procedure

A device performing scanning, that is, a scanning device performs a scanning procedure to listen to undirected broadcasting of user data from advertising devices using an advertising physical channel.

A scanning device transmits a scan request to an advertising device through an advertisement physical channel to request additional user data from the advertising device. The advertising device transmits a scan response, which is a response to the scan request, by including the additional user data that the scanning device has requested through the advertisement physical channel.

The scanning procedure may be used while being connected to other BLE device in the BLE piconet.

If the scanning device is in an initiator mode in which the scanning device may receive an advertising event and initiates a connection request. The scanning device may transmit a connection request to the advertising device through the advertising physical channel to start a Bluetooth connection with the advertising device.

When the scanning device transmits a connection request to the advertising device, the scanning device stops the initiator mode scanning for additional broadcast and enters the connected mode.

Discovering Procedure

Devices available for Bluetooth communication (hereinafter, referred to as "Bluetooth devices") perform an advertising procedure and a scanning procedure in order to discover devices located nearby or in order to be discovered by other devices within a given area.

The discovering procedure is performed asymmetrically. A Bluetooth device intending to discover other device nearby is termed a discovering device, and listens to discover devices advertising an advertising event that may be scanned. A Bluetooth device which may be discovered by other device and available to be used is termed a discoverable device and positively broadcasts an advertising event such that it may be scanned by other device through an advertising (broadcast) physical channel.

Both the discovering device and the discoverable device may have already been connected with other Bluetooth devices in a piconet.

Connecting Procedure

A connecting procedure is asymmetrical, and requests that, while a specific Bluetooth device is performing an advertising procedure, another Bluetooth device should perform a scanning procedure.

That is, an advertising procedure may be aimed, and as a result, only one device may response to the advertising. After a connectable advertising event is received from an advertising device, a connecting request may be transmitted to the advertising device through an advertising (broadcast) physical channel to initiate connection.

Hereinafter, operational states, that is, an advertising state, a scanning state, an initiating state, and a connection state, in the BLE technology will be briefly described.

Advertising State

A link layer (LL) enters an advertising state according to an instruction from a host (stack). In a case in which the LL is in the advertising state, the LL transmits an advertising packet data unit (PDU) in advertising events.

Each of the advertising events include at least one advertising PDU, and the advertising PDU is transmitted through an advertising channel index in use. After the advertising PDU is transmitted through an advertising channel index in use, the advertising event may be terminated, or in a case in which the advertising device may need to secure a space for performing other function, the advertising event may be terminated earlier.

Scanning State

The LL enters the scanning state according to an instruction from the host (stack). In the scanning state, the LL listens to advertising channel indices.

The scanning state includes two types: passive scanning and active scanning. Each of the scanning types is determined by the host.

Time for performing scanning or an advertising channel index are not defined.

During the scanning state, the LL listens to an advertising channel index in a scan window duration. A scan interval is defined as an interval between start points of two continuous scan windows.

When there is no collision in scheduling, the LL should listen in order to complete all the scan intervals of the scan window as instructed by the host. In each scan window, the LL should scan other advertising channel index. The LL uses every available advertising channel index.

In the passive scanning, the LL only receives packets and cannot transmit any packet.

In the active scanning, the LL performs listening in order to be relied on an advertising PDU type for requesting advertising PDUs and advertising device-related additional information from the advertising device.

Initiating State

The LL enters the initiating state according to an instruction from the host (stack).

When the LL is in the initiating state, the LL performs listening on advertising channel indices.

During the initiating state, the LL listens to an advertising channel index during the scan window interval.

Connection State

When the device performing a connection state, that is, when the initiating device transmits a CONNECT_REQ PDU to the advertising device or when the advertising device receives a CONNECT_REQ PDU from the initiating device, the LL enters a connection state.

It is considered that a connection is generated after the LL enters the connection state. However, it is not necessary to consider that the connection should be established at a point in time at which the LL enters the connection state. The only difference between a newly generated connection and an already established connection is a LL connection supervision timeout value.

When two devices are connected, the two devices play different roles.

An LL serving as a master is termed a master, and an LL serving as a slave is termed a slave. The master adjusts a timing of a connecting event, and the connecting event refers to a point in time at which the master and the slave are synchronized.

Hereinafter, packets defined in an Bluetooth interface will be briefly described. BLE devices use packets defined as follows.

Packet Format

The LL has only one packet format used for both an advertising channel packet and a data channel packet.

Each packet includes four fields of a preamble, an access address, a PDU, and a CRC.

When one packet is transmitted in an advertising physical channel, the PDU may be an advertising channel PDU, and when one packet is transmitted in a data physical channel, the PDU may be a data channel PDU.

Advertising Channel PDU

An advertising channel PDU has a 16-bit header and payload having various sizes.

A PDU type field of the advertising channel PDU included in the heater indicates PDU types defined in Table 1 below.

TABLE 1

| PDU Type | Packet Name |
| --- | --- |
| 0000 | ADV_IND |
| 0001 | ADV_DIRECT_IND |
| 0010 | ADV_NONCONN_IND |
| 0011 | SCAN_REQ |
| 0100 | SCAN_RSP |
| 0101 | CONNECT_REQ |
| 0110 | ADV_SCAN_IND |
| 0111-1111 | Reserved |

Advertising PDU

The following advertising channel PDU types are termed advertising PDUs and used in a specific event.

ADV_IND: Connectable undirected advertising event

ADV_DIRECT_IND: Connectable directed advertising event

ADV_NONCONN_IND: Unconnectable undirected advertising event

ADV_SCAN_IND: Scannable undirected advertising event

The PDUs are transmitted from the LL in an advertising state, and received by the LL in a scanning state or in an initiating state.

Scanning PDU

The following advertising channel DPU types are termed scanning PDUs and are used in a state described hereinafter.

SCAN_REQ: Transmitted by the LL in a scanning state and received by the LL in an advertising state.

SCAN_RSP: Transmitted by the LL in the advertising state and received by the LL in the scanning state.

Initiating PDU

The following advertising channel PDU type is termed an initiating PDU.

CONNECT_REQ: Transmitted by the LL in the initiating state and received by the LL in the advertising state.

Data Channel PDU

The data channel PDU may include a message integrity check (MIC) field having a 16-bit header and payload having various sizes.

The procedures, states, and packet formats in the BLE technology discussed above may be applied to perform the methods proposed in this disclosure.

FIG. 5 is a view illustrating an example of a structure of a generic attribute profile (GATT) of Bluetooth low energy.

Referring to FIG. 5, a structure for exchanging profile data of Bluetooth low energy may be looked through.

In detail, the GATT defines a method for exchanging data using a service between Bluetooth LE devices and a characteristic.

In general, a peripheral device (for example, a sensor device) serves as a GATT server, and has definition regarding a service and a characteristic.

In order to read or write data, a GATT client sends a data request to the GATT server, and every operation (transaction) is started by the GATT client and a response is received from the GATT server.

A GATT-based operational structure used in the Bluetooth LE may be a vertical structure as illustrated in FIG. 5 on the basis of a profile, a service, and a characteristic.

The profile includes one or more services, and the services may include one or more characteristics or other services.

The service serves to divide data into logical units and may include one or more characteristics or other services, each of the services has a 16-bit or 128-bit identifier called a universal unique identifier (UUID)).

The characteristic is the lowermost unit in the GATT-based operational structure. The characteristic includes only one data, and has a 16-bit or 128-bit UUID, similar to the service.

The characteristic is defined by values of various types of information, and in order to hold each information, an attribute may be required for each information. The characteristic may use several continuous attributes.

The attribute has four components and has meanings as follows.

handle: Address of attribute

Type: Type of attribute

Value: Value of attribute

Permission: Right to access attribute

The present invention proposes a method in which a sensor measures and stores human activities by using a GATT-based operational structure of the Bluetooth LE, and a client retrieves the stored information from the sensor.

FIG. 6 illustrates one example of displaying human activities in a temporal order according to the present invention.

With reference to FIG. 6, human body activities can be measured by time and activity to measure human body activity by using a sensor device based on Bluetooth LE.

More specifically, human activities can be classified by activities performed continuously. In other words, as shown in FIG. 6, a sensor device (or server device) can divide human activities into a period in which a user takes continuous sleep (sleep 1 or sleep 2), a period in which the user takes a continuous walk (walk 1, walk 2, or walk 3), a period in which the user does no-activity (no-activity 1), and a period in which the user runs continuously (running 1 or running 2); and measure specific information about each activity.

The specific information about the measured activity can be stored in the sensor device, and the stored information can be transmitted upon request of a client device.

Also, in case the client device transmits a request to measure or monitor specific information about a specific activity, measurement or monitoring of the requested activity can be performed.

FIG. 7 illustrates one example of the overall structure of human activity data according to the present invention.

With reference to FIG. 7, measurement information about the user activities of FIG. 6 are stored separately for each activity.

More specifically, information of specific activity performed continuously over a predetermined time period can be stored separately, and the stored activity data can be stored into the integrated information about specific information over a predetermined time period. For example, data related to the user's walk can be stored separately by time intervals as walk 1, walk 2, or walk 3; and the walk 1, walk 2, or walk 3 can be stored into the integrated walk data.

In this manner, user activities such as no-activity, running, sleeping, swimming, and eating can be measured and stored.

The integrated information stored separately for each activity can be stored into the overall activity data which is integrated information about all of the activities performed over a predetermined time period.

The aforementioned data structure can be applied to both of a sensor device (or server device) and a client device, and the client device can process the information provided by the sensor device (or server device) and provide the processed information to the user.

FIGS. 8 to 10 illustrate one example of data measurement according to activity of a user according to the present invention; FIG. 8 shows a case of measuring all of the activities, FIG. 9 shows a case of measuring walking activity only, and FIG. 10 shows a case of measuring sleep activity only.

With reference to FIG. 8, the sensor device can measure and store all of activities of the user upon request of a client device or by the sensor device itself.

Table 2 below illustrates one example of parameters measured when all of the activities are measured.

TABLE 2

| Parameter | Description |
| --- | --- |
| From time for monitoring | The time from which monitoring or measurement starts |
| To Time or duration for monitoring | The time period for which monitoring or measurement is performed |
| Total Consumed Calorie | Total calories consumed |
| Total Moving distance | Total distance moved |
| Total climbing height | Total height climbed |
| Average speed | Average speed |

TABLE 2-continued

| Parameter | Description |
| --- | --- |
| Max speed | Maximum speed |
| Min speed | Minimum speed |
| Total Waking | Data about total time of walking |
| Total Running | Data about total time of running |
| Total Sleeping | Data about total time of sleep |
| Total Swimming | Data about total time of swimming |
| Total eating | Data about total time of eating |
| Total No-activity | Data about total time of no-activity |

In Table 2, the total walking data to the total no-activity data can comprise sub-parameters.

Table 3 below illustrates one example of parameters comprising the total walking data.

TABLE 3

| Parameter | Description |
| --- | --- |
| Walking activity number | The number of walking activities measured |
| Total waking duration | Total time of walking activity |
| Total walking Distance | Total walking distance |
| Consumed Calorie | Calories consumed |
| Total walking steps | Total walking steps |
| Average/Max/Min Speed | Average/Maximum/Minimum speed |

Table 4 below shows one example of parameters comprising the total running data.

TABLE 4

| Parameter | Description |
| --- | --- |
| Running activity number | The number of running activities measured |
| Total Running duration | Total time of running activity |
| Total Running Distance | Total running distance |
| Consumed Calorie | Calories consumed |
| Total Running steps | Total running steps |
| Average/Max/Min Speed | Average/Maximum/Minimum speed |

Table 5 below shows one example of parameters comprising the total sleep data.

TABLE 5

| Parameter | Description |
| --- | --- |
| sleeping activity number | The number of sleep activities measured |
| Total sleeping duration | Total time of sleep |
| Consumed Calorie | Calories consumed |
| Average/Best/Worst quality | Average/Best/Worst sleep quality |

Table 6 below shows one example of parameters comprising the total swimming data.

TABLE 6

| Parameter | Description |
| --- | --- |
| Swimming activity number | The number of swimming activities measured |
| Total swimming duration | Total time of swimming activity |
| Total swimming distance | Total swimming distance |
| Consumed Calorie | Calories consumed |
| Total Arm swing number | Total number of arm swing motions |
| Total Leg stroke number | Total number of leg strokes |
| Average/Max/Min speed | Average/Maximum/Minimum speed |

Table 7 below shows one example of parameters comprising the total eating data.

TABLE 7

| Parameter | Description |
| --- | --- |
| Eating activity number | The number of eating activities measured |
| Total Eating duration | Total time of eating activity |
| Total input Calories | Total input calories |
| Average/Max/min input calorie | Average/Maximum/Minimum input calorie |

Table 8 below shows one example of parameters comprising the total no-activity data

TABLE 8

| Parameter | Description |
| --- | --- |
| No-Activity number | The number of no-activity measured |
| Total No-Activity duration | Total time of no-activity |
| Total Consumed Calorie | Total calories consumed |

The total activity data measured as described above can be transmitted upon request of the client device and can be processed by the client device.

FIG. 9 illustrates measurement of walking activities, in which the sensor device (service device) performs measurement of walking activity only among the entire activities of the user.

More specifically, the sensor device can measure only the walking activity from among the entire activities of the user upon request of a client device requesting monitoring the walking activity or according to predetermined configuration.

The measured data is stored in each walking interval, and data about each walking interval is stored again in the total walking data.

Table 9 shows one example of parameters comprising the total walking data.

TABLE 9

| Parameter | Description |
| --- | --- |
| From time for monitoring | Time at which monitoring or measurement starts |
| To time or duration for monitoring | Time period or interval for which monitoring or measurement is performed |
| Walking activity number | The number of walking activities measured |
| Total walking Duration | Total time of walking activity |
| Total walking Distance | Total walking distance |
| Total Consumed Calorie | Total calories consumed |
| Total Walking Step | Total walking steps |
| Average speed | Average speed |
| Max Speed | Maximum speed |
| Min Speed | Minimum speed |
| Walking 1 | Walking 1 data |
| Walking 2 | Walking 2 data |

The parameters "From time for monitoring" and "To time or duration for monitoring" of Table 9 can be obtained from the parameters of the total activity data.

Also, the "Walking 1" and the "Walking 2" are walking activity data measured in a continuous, specific time period and can include the parameters shown in Table 10 below.

TABLE 10

| Parameter | Description |
| --- | --- |
| Start time | Walking activity start time |
| End time or duration | Walking activity end time or end period |

TABLE 10-continued

| Parameter | Description |
| --- | --- |
| Walking Distance | Walking distance |
| Consumed Calorie | Calories consumed |
| Walking Step | Walking steps |
| Average speed | Average speed |
| Max Speed | Maximum speed |
| Min Speed | Minimum speed |

The sensor device which has measured the parameters of Table 9 and 10 can transmit or store measured data to the client device.

Also, the data structure about the total running activity can be the same as the data structure about the total walking activity described above.

FIG. 10 illustrates measurement about sleep activity, in which the sensor device (service device) performs measurement of sleep activity only among the entire activities of the user.

More specifically, the sensor device can measure only the sleep activity from among the entire activities of the user upon request of a client device requesting monitoring the sleep activity or according to predetermined configuration.

The measured data is stored in each sleep interval, and data about each sleep interval is stored again in the total sleep data.

Table 11 shows one example of parameters comprising the total sleep data.

TABLE 11

| Parameter | Description |
| --- | --- |
| From time for monitoring | Time at which monitoring or measurement starts |
| To time or duration for monitoring | Time period or interval for which monitoring or measurement is performed |
| Sleeping activity number | The number of sleep activities measured |
| Total Sleeping Activity Duration | Total period of sleep |
| Total Consumed Calorie | Total calories consumed |
| Average quality | Average quality of sleep |
| Best quality | Best quality of sleep |
| Worst quality | Worst quality of sleep |
| sleeping 1 | Sleep 1 data |
| sleeping 2 | Sleep 2 data |

The parameters "From time for monitoring" and "To time or duration for monitoring" of Table 11 can be obtained from the parameters of the total activity data.

Also, the "sleeping 1" and the "sleeping 2" are walking activity data measured in a continuous, specific time period and can include the parameters shown in Table 12 below.

TABLE 12

| Parameter | Description |
| --- | --- |
| Start time | Sleep activity start time |
| End time or duration | Sleep activity end time or end period |
| Consumed Calorie | Calories consumed |
| Average quality | Average quality of sleep |
| Max quality | Best quality of sleep |
| Min quality | Worst quality of sleep |

The sensor device which has measured the parameters of Table 11 and 12 can transmit or store measured data to the client device.

In another embodiment of the present invention, the sensor device (service device) can measure only swimming activity among the entire activities of the user.

More specifically, the sensor device can measure only the swimming activity from among the entire activities of the user upon request of a client device requesting monitoring the swimming activity or according to predetermined configuration.

The measured data is stored in each walking interval, and data about each swimming interval is stored again in the total sleep data.

Table 13 shows one example of parameters comprising the total swimming data.

TABLE 13

| Parameter | Description |
| --- | --- |
| From time for monitoring | Time at which monitoring or measurement starts |
| To time or duration for monitoring | Time period or interval for which monitoring or measurement is performed |
| Swimming activity number | The number of swimming activities measured |
| Total swimming Duration | Total time of swimming activity |
| Total swimming distance | Total swimming distance |
| Total Consumed Calorie | Total calories consumed |
| Total Arm swing number | Total number of arm swing motions |
| Total Leg stroke number | Total number of leg strokes |
| Average speed | Average speed |
| Max speed | Maximum speed |
| Min speed | Minimum speed |
| Swimming 1 | Swimming 1 data |

The parameters "From time for monitoring" and "To time or duration for monitoring" of Table 13 can be obtained from the parameters of the total activity data.

Also, the "swimming 1" is walking activity data measured in a continuous, specific time period and can include the parameters shown in Table 14 below.

TABLE 14

| Parameter | Description |
| --- | --- |
| Start time | Swimming activity start time |
| End time or duration | Swimming activity end time or end period |
| Total swimming distance | Total swimming distance |
| Total Consumed Calorie | Total calories consumed |
| Total Arm swing number | Total number of arm swing motions |
| Total Leg stroke number | Total number of leg strokes |
| Average speed | Average speed |
| Max speed | Maximum speed |
| Min speed | Minimum speed |

The sensor device which has measured the parameters of Table 13 and 14 can transmit or store measured data to the client device.

By using the method above, eating activity and no-activity can also be measured.

Table 15 below shows one example of parameters included in the total eating activity data, and Table 16 below shows one example of parameters included in each eating activity data.

TABLE 15

| Parameter | Description |
| --- | --- |
| From time for monitoring | Time at which monitoring or measurement starts |
| To time or duration for monitoring | Time period or interval for which monitoring or measurement is performed |
| eating activity number | The number of eating activities measured |

TABLE 15-continued

| Parameter | Description |
| --- | --- |
| Total Eating Duration | Total time of eating activity |
| Total Eating Calorie | Total swimming distance |
| Average Eating Calorie | Total input calories from eating activity |
| Max Eating Calorie | Average input calories from eating activity |
| Min Eating Calorie | Maximum input calories from eating activity |
| Eating 1 | Eating 1 data |
| Eating 2 | Eating 2 data |

TABLE 16

| Parameter | Description |
| --- | --- |
| Start time | Eating activity start time |
| End time or duration | Eating activity end time or end period |
| Eating Calorie | Input calories from eating |

Table 17 below shows one example of parameters included in the total no-activity data, and Table 18 below shows one example of parameters included in each no-activity data.

TABLE 17

| Parameter | Description |
| --- | --- |
| From time for monitoring | Time at which monitoring or measurement starts |
| To time or duration for monitoring | Time period or interval for which monitoring or measurement is performed |
| No-Activity number | Total number of no-activities measured |
| Total No-Activity Duration | Total time of no-activity |
| Total No-Activity Calorie | Total calories consumed from no-activity |
| Average No-Activity Calorie | Average calories consumed from no-activity |
| Max No-Activity Calorie | Maximum calories consumed from no-activity |
| Min No-Activity Calorie | Minimum calories consumed from no-activity |
| No-Activity 1 | No-activity 1 data |
| No-Activity 2 | No-activity 2 data |

TABLE 18

| Parameter | Description |
| --- | --- |
| Start time | No-activity start time |
| End time or duration | No-activity end time or end period |
| Average No-Activity Calorie | Average calories consumed |
| Max No-Activity Calorie | Maximum calories consumed |
| Min No-Activity Calorie | Minimum calories consumed |

To measure the data shown in Tables 2 to 18, there should be a monitoring or measurement request from a client device, and to this purpose, a sensor device (server device) can provide basic data to the client device.

Table 19 below shows one example of setting values to define a method for the server device to measure data, which is required by the server device to provide the basic data.

TABLE 19

| Characteristic Name | Requirement | Mandatory Properties |
|---|---|---|
| Distance | | Read, Indication/Notification |
| Activity Duration | | Read, Indication/Notification |
| Monitored Duration | | Read, Write, Indication/Notification |
| Start Time | | Read, Write, Indication/Notification |
| End Time | | Read, Write, Indication/Notification |
| Steps | | Read, Indication/Notification |
| Height | | Read, Indication/Notification |
| Calories | | Read, Indication/Notification |
| Elevation | | Read, Indication/Notification |
| Sleep quality | | Read, Indication/Notification |
| User Index/ID | | Read, Write |
| Speed | | Read, Indication/Notification |
| Supported Activity Type | | Read |
| Monitored Activity Type | | Read, Write, Indication/Notification |
| Current Activity Type | | Read, Write, Indication/Notification |
| Notification/Indication Period | | Read, Write |
| Measuring Interval | | Read, Write |
| Measured Data Value Type | | Read, Write |
| Measured Data Type | | Read, Write |

In what follows, each characteristic is described.

Distance: Distance travelled from such activities as walking, running, cycling, and swimming.

Activity Duration: Time period for which a specific activity is performed.

Monitored Duration: Time period for which an activity is monitored.

Start time: Time at which activity sensing starts. It represents the time at which a server device starts sensing irrespective of activity type or sensing a specific activity.

End time: Time at which activity sensing ends. It represents the time at which a server device ends sensing irrespective of activity type or sensing a specific activity.

Steps: The number of steps measured through activity sensing. An average, maximum, and minimum value of steps can be provided.

Height: Height moved through an activity. An average, maximum, and minimum value of calories consumed can be provided.

Calories: Calories consumed through an activity. An average, maximum, and minimum value of calories consumed can be provided.

Elevation: Height elevated from an activity.

Sleep quality: Quality of sleep.

User Index/ID: A value used for identifying a particular user.

Speed: Movement speed measured through activity sensing.

Supported Activity Type: Activity type supported by a sensor device.

Monitored Activity Type: Activity type measured through sensing, which can correspond to multiple activity types.

Current Activity Type: Activity type measured through current sensing, which provides one activity type value.

Notification/Indication Period: Period at which a measured sensing value is provided to a client device.

Measuring Interval: Period at which a sensor device measures data.

Measured Data Value Type: Type of data value measured by a sensor device.

Measured Data Type: Data type measured by a sensor device.

The respective characteristic values can be provided as each individual value or as an integrated value according to activity type or actual activity.

FIG. 11 is a flow diagram illustrating one example of a method for data measurement and exchange according to the present invention.

With reference to FIG. 11, a client device can receive measured data from a server device.

More specifically, the client device 110 transmits a read request to the server device 120 to retrieve activity type that the server device supports, which is stored in the Supported Activity Type characteristic shown in Table 19 above S1110.

The server device 120 can transmit a value stored in the Supported Activity Type of the server device 120 to the client 110 in response to the read request through a read response S1120.

At this time, the server device 120 or the client device can select various activity types through "And Bit operation". In other words, various activity types can be selected in such a way that if a specific activity is selected, it is represented as '1', but '0', otherwise.

Table 20 below shows one example of the "And Bit operation".

TABLE 20

| $7^{th}$ bit | $6^{th}$ bit | $5^{th}$ bit | $4^{th}$ bit | $3^{rd}$ bit | $2^{nd}$ bit | $1^{st}$ bit | $0^{th}$ bit |
|---|---|---|---|---|---|---|---|
| | | Stepping | Swimming | Climbing | Sleeping | Running | Walking |

The client device 110 which has found out activities supported by the server device 120 through the read request and the read response can define an activity type that the server device 120 has to measure by transmit a write request S1130. In other words, the client device 110 can request measurement of a specific activity through the "Monitoring Activity Type" characteristic of Table 19.

At this time, the write request can be used to select various activity types through "And Bit operation" as described above.

In case sensing an activity not supported by the server device 120 is requested, the server device 120 can inform the client device 110 by transmitting an error response that the corresponding activity is not supported.

Afterwards, the server device 120 transmits a write response to the client device 110 in response to the write request S1140 and starts sensing by selecting the activity that the client device has requested.

In case the client device 110 wants to obtain information about the activity being sensed by the server device 120, the client device 110 can request the value of the Current Activity Type characteristic from the server device 110 through a read request S1150.

The Current Activity data characteristic defines type of activity being measured by the server device 120 and selects a specific activity type through a value of single bit only.

The server device 120 transmits type of activity being measured, which is stored in the Current Activity Type, to the client device 110 through a read response in response to the write request S1160.

Afterwards, in case the user's activity is changed, the sensor device can measure the changed activity type and inform the client device 110 of this change through an indication message S1170. At this time, if the sensor device is not currently connected to the client device, the sensor device later can transmit information about the time at which the activity has changed together with measured data.

In response to the indication message, the client device 110 can transmit a confirm message to the server device 120, S1180.

By using the method above, the human activity supported by the server device 120 can be measured, and measured values can be transmitted to the client device 110.

FIG. 12 is a flow diagram illustrating another example of a method for data measurement and exchange according to the present invention.

With reference to FIG. 12, a measurement period or data generation interval can be set up in the server device to receive measured or generated data according to the setting from the server device.

More specifically, the client device 110 can configure the "Measuring Interval" characteristic shown in Table 19 by transmitting a write request to the server device 120, S1210.

The "Measuring Interval" is used to configure a period at which the sensor device 120 measures or generates data, and data can be measured at a period of millisecond or more. Also, the configured period can be requested through a read request if needed.

In case a measurement period of the sensor device 120 is configured through a write request of the client device 110, the sensor device 120 can transmit a write response to the client device 110, S1220.

Afterwards, the client device 110 can select the type of data to be measured by the server device 120 by configuring the "Measured Data Type" shown in Table 19 through a write request S1230. If needed, the configured value can be requested through a read request/response.

At this time, the client device 110 can request measurement of various type values through the "And bit" operation described above.

Table 21 below shows one example of data format of the "And bit" operation used by the client device to request measurement of various type values.

TABLE 21

| $7^{th}$ bit | $6^{th}$ bit | $5^{th}$ bit | $4^{th}$ bit | $3^{rd}$ bit | $2^{nd}$ bit | $1^{st}$ bit | $0^{th}$ bit |
|---|---|---|---|---|---|---|---|
| | | STDDEV | Min | | Max | | Average |

If the "And bit" operation is not applied, only one activity type can be selected or provided.

The server device 120 can transmit a write response to the server device 110 in response to the write response S1240.

Afterwards, the server device 120 can measure or generate data at the measurement intervals. At this time, configured data values are measured and stored at each configured period to which both of the Measuring Interval and the Measured Data Type are applied simultaneously.

The client device 110 transmits a read request to the server device 120 to request transmission of data measured by the server device 120 and stored in the "Measured Data" characteristic S1250.

The server device 120 can transmit the data value measured at the configured intervals to the client device 110 through a read response in response to the read request S1260.

At this time, the measured data can include measured time information. Also, measured data can be a single measurement value or a series of measured data streams.

FIG. 13 is a flow diagram illustrating a yet another example of a method for data measurement and exchange according to the present invention.

With reference to FIG. 13, a server device can transmit measured data at predetermined intervals even in the absence of a request from the client device.

More specifically, the client device 110 can select the type of data to be measured by the server device 120 by setting the "Measured Data Type" characteristic shown in Table 19 through a write request S1310. If needed, the setting value can be requested through a read request/response.

At this time, the client device 110 can request measurement of various types through the "And bit" operation described above.

Table 22 below shows one example of a data format of the "And bit" operation used by the client device to request measurement of various types.

TABLE 22

| $7^{th}$ bit | $6^{th}$ bit | $5^{th}$ bit | $4^{th}$ bit | $3^{rd}$ bit | $2^{nd}$ bit | $1^{st}$ bit | $0^{th}$ bit |
|---|---|---|---|---|---|---|---|
| Height | Speed | End Time | Start Time | Sleep Quality | Steps | Distance | Calorie |

The server device 120 can transmit a write response to the client device 110 in response to the write request S1320.

Afterwards, the client device 110 can set up the "Indication Period" of Table 19 by transmitting a write request to the server device 120, S1330. For example, in case the client device 110 sets the "Indication Period" to "10 s", the server device 120 can transmit data measured every 10 s to the client device 110.

If needed, the configured value can be requested through a read request.

The server device 120 can transmit a write response to the client device 110 in response to the write request S1340.

Afterwards, the server device 120 transmits the data measured at the configured intervals to the client device 110 through an indication message S1350, and the client device 110 transmits a confirmation message to the server device 120 in response to the transmission S1360.

FIGS. 14a and 14b illustrates one example of a method for transmitting a control message for data measurement and related parameters according to the present invention.

With reference to FIG. 14a, a client device can control the operation of the server device by transmitting to the server device a message by which the client device can control the operation of the server device.

More specifically, the client device 110 can configure the operation of the server device 120 by transmitting a write request to the server device 120, S1410. For example, the client device 110 can configure the "Sensor Control Point" value by transmitting a write request to the server device 120.

FIG. 14b illustrates one example of the "Sensor Control Point" value for controlling the operation of the server device 120 and a control operation according to the value.

Activate: starts the sensor device for physical activity monitoring. Monitoring Activity Type and Monitored Data Type can be provided as parameters, and activities corresponding to the parameters are monitored.

Deactivate: terminates the sensor device for monitoring a specific physical activity. Monitoring Activity Type and Monitored Data Type can be provided as parameters, but activities corresponding to the parameters are not monitored.

Reset: resets the data about a specific physical activity monitored by the sensor device. Monitoring Activity Type and Monitored Data Type can be provided as parameters, and the values of the corresponding activities are initialized according to the parameters.

Download: requests data about a specific physical activity monitored by the sensor device. Monitoring Activity Type and Monitored Data Type can be provided as parameters, and data values of the corresponding activities according to the parameters can be requested (can be downloaded in the form of a file or a data stream through the L2CAP channel).

ChangeActivityType: changes type of activity being monitored by the sensor device. Monitoring Activity Type can be provided as a parameter, and activities corresponding to the parameter are monitored.

ChangeDataType: changes data type of activities being monitored by the sensor device. Monitoring Data Type can be provided as a parameter, and activities corresponding to the parameter are monitored.

ChangePeriod, ChangeInterval: changes Notification/Indication Period and Measuring Interval for the value being monitored in the sensor device. Notification/Indication Period and Measuring Interval value are provided as parameters and operations according to the parameters are changed.

The server device 120 which has received the write request transmits a write response to the client device in response to the write response S1420.

Afterwards, the server device 120 operates according to the operation configured by the client device 110.

FIG. 15 is a flow diagram illustrating a still another example of a method for data measurement and exchange according to the present invention.

With reference to FIG. 15, if receiving a request for monitoring or measuring a specific activity from a client device, a server device can perform monitoring or measurement of the corresponding activity.

More specifically, a server device 120 transmits an advertising message to nearby devices S1510. The server device 120 can inform the nearby devices through the advertising message that it supports a monitoring function about a specific activity.

The client device 110 can know from an advertising message of the server device that the sensing device supports a monitoring function and transmits a connection request message to the server device 120 for connection to the server device 120, S1520.

The client device 110 connected to the server device 120 according to Bluetooth LE through the connection request message can request monitoring or measurement of a specific activity by transmitting a write request to the server device and configuring the Monitoring Activity Type S1530.

However, in case a specific activity that the client device 110 has requested corresponds to the activity type not supported by the server device 120, the server device 120 transmits an error response on the grounds that the specific activity is of the activity type not supported S1540.

Table 23 below shows one example of an error response that can be applied according to the present invention.

TABLE 23

| Error Code (hexadecimal value) | Error Name | Description |
| --- | --- | --- |
| 0x80 | Wrong Activity Type | Request for a value about wrong activity type (write or read) |
| 0x81 | Wrong Data Type | Request for a value about wrong activity data type (write or read) |
| 0x82 | Not Supported(Function or etc) | Request for an operation about a function not supported (write or read) |
| 0x83 | Data Corrupted | Measurement data are corrupted |
| 0x84 | Low Battery | Battery is low |
| 0x85 | Out of Order | Device is out of order |

The client device 110 which has received the error response transmits a read request for the "Activity Monitor Feature" value to the server device 120 to read activity type that the server device 120 supports S1550.

The "Activity Monitor Feature" provides information about the function that the server device 120 supports.

Table 24 shows one example of a data format of the "Activity Monitor Feature".

TABLE 24

| 1 byte | 1 byte | ... 1 byte |
| --- | --- | --- |
| Supported Activity Types | $1^{st}$ Measured Type | ... $n^{th}$ Measured Type |

The Supported Activity Type indicates the activity type that the sensor device 110 supports as shown in Table 19. Similar to the "And bit" operation described above, the bit value of a supported activity type can be denoted as 1. For example, in case the server device is capable of measuring walking activity, the walking bit of the Supported Activity Types can be set to 1.

As described in Table 21 of FIG. 12 and Table 22 of FIG. 13, the Measured Type can represent a data value measured with respect to a specific activity type and the type of measured data. In other words, in case the bit value of the Supported Activity Type has the value of "1", information about the type of data that can be measured with respect to the corresponding activity type can be provided.

The Measured Type can be included by as many times as the number of activities supported in the Supported Activity Type. For example, in case the server device 120 supports monitoring of four activities such as "Walking", "Running", "Sleeping", and "Swimming", four Measured Types can be included, ranging from $1^{st}$ Measured Type to $4^{th}$ Measured Type.

The Measured Type can have a value expressed by more than 1 byte according to activity type.

Table 25 below shows one example of a data format of the Measured Type.

TABLE 25

| 15th~9th bit | 8th bit | 7th bit | 6th bit | 5th bit | 4th bit | 3rd bit | 2nd bit | 1st bit | 0th bit |
|---|---|---|---|---|---|---|---|---|---|
| RFU | Min | Average | STDEV | End Time (or Duration) | Start time | Speed | Steps | Distance | Calorie |

The server device 120 which has received the read request can transmit the value of "Activity Monitor Feature" to the client device 110 through a read response of Table 24 and Table 25 S1560.

The client device 110 which has found out the activity type that the server device 120 can support through the "Activity Monitor Feature" value can request monitoring of a specific activity among activity types that the server device can support through a write request S1570.

Afterwards, the server device 120 can transmit a write response in response to the write request of the client device 110 S1580 and start monitoring of the requested activity.

Through the method above, monitoring or measurement of a specific human activity, and information about various body activities can be checked through measured values.

FIG. 16 is a flow diagram illustrating an additional example of a method for data measurement and exchange according to the present invention.

With reference to FIG. 16, a client device can check which activity is currently being measured by a server device and obtain a specific value about the activity.

More specifically, the server device 120 can inform a nearby device of the "Activity Monitor Feature" value described in FIG. 15 through an advertising message S1610.

The client device 110 which has found out activity types that the server device 120 can support transmits a connection request message to establish a Bluetooth LE connection with the server device 120, S1620.

Afterwards, the client device 110 can transmit a read request to the server device 120 to check type of activity that is currently being measured by the server device 120, S1630.

In case the activity type being monitored is sleep, the server device 120 can transmit the activity type to the client device 110 through a read response S1660.

After checking the activity type being measured through the read response, the client device 110 can transmit a read request to the server device 120 to request data with respect to the "quality of sleep" which is specific data of the "sleep" activity being measured S1670.

The server device 120 can transmit "Good" value, which is currently measured data, to the client device 110 through a read response in response to the read request S1680.

Through the method above, the client device 110 can know the activity type being measured by the server device 120 and specific data about the activity type.

FIG. 17 is a flow diagram illustrating one example of a method for controlling a device through a control message according to the present invention.

With reference to FIG. 17, a client device can control operation of a server device by transmitting a control message.

The server device 120 can inform a nearby device of the "Activity Monitor Feature" value described in FIG. 15 through an advertising message S1710.

The client device 110 which has found out activity types that the server device 120 can support transmits a connection request message to establish a Bluetooth LE connection with the server device 120, S1720.

Afterwards, the client device 110 request to write "0x02" into the Sensor Control Point described in FIGS. 14a and 14b to deactivate the server device 100, S1730.

However, in case the server device 120 does not currently support a deactivation function, the server device 120 can transmit an error response described with respect to FIG. 15 and Table 23 to the client device 110, S1760. At this time, the error code can have the value of "0x82".

After receiving an error response, the client device 110 requests to write "0x01" into the Sensor Control Point described in FIGS. 14a and 14b to activate the server device 120, S1770.

Since a device can be activated according to the request of the client device in case the server device 120 currently supports Activate function, the server device 120 transmits a write response to the client device 110, S1780.

Afterwards, the server device 120 activates a device according to the request of the client device 110.

By using the method above, the server device can be controlled through a write request.

Various substitutions, modifications, and changes can be made to the present invention described above by those skilled in the art to which the present invention belongs without leaving the technical scope of the present invention; therefore, the present invention is not limited to the embodiments above and appended drawings.

The invention claimed is:

1. A method for transmitting and receiving activity data of a user through Bluetooth LE (Low Energy) in a wireless communication system, a method performed by a first device, comprising:
transmitting an advertising message indicating support of a measurement service for a user's activity to a second device;
receiving a first request message requesting measurement of a specific activity of a user from the second device;
transmitting a first response message to the second device in response to the first request message, when the specific activity is supported by the first device; and
measuring the specific activity,
wherein the first request message includes activity type indicating type of the specific activity.

2. The method of claim 1, further comprising:
transmitting an error message to the second device, when the specific is not supported by the first device;
receiving from the second device a second request message requesting activity information of user supported by the first device;
transmitting to the second device a second response message including the supported activity information of a user in response to the second request message;
receiving a third request message requesting measurement of an activity included in the activity information of the user; and transmitting a third response message in response to the third request message.

3. The method of claim 2, wherein the supported activity information of the user includes an activity type indicating type of body activity of a user and measured data type information.

4. The method of claim 3, wherein the data type information includes at least one of speed information, calorie information, time information, distance information, or activity number information indicating how many times the activity has been performed.

5. The method of claim 1, further comprising:
receiving a second request message requesting a measurement value of the specific activity from the second device; and
transmitting a second response message including the measurement value in response to the second request message.

6. The method of claim 1, further comprising:
receiving a second request message requesting configuration of a transmission period of measurement value of the specific activity; and
transmitting the measurement value to the second device for each transmission period.

7. The method of claim 1, further comprising:
receiving a control message requesting a specific operation from the second device; and
performing the specific operation based on the control message,
wherein the specific operation is one of activation of measurement operation of the specific activity, deactivation, reset of measured data, download of measured data, change of the specific activity, change of measured data, or change of transmission period.

8. The method of claim 1, further comprising:
receiving a connection request message from the second device based on the advertising message; and
establishing a Bluetooth LE connection with the second device.

9. A method for transmitting and receiving activity data of a user through Bluetooth LE (Low Energy) in a wireless communication system, a method performed by a first device, comprising:
transmitting an advertising message including supported activity information of a user to a second device;
receiving a first request message requesting activity type information being measured from the second device;
transmitting a first response message including the activity type information being measured to the second device based on the first request message;
receiving a second request message requesting specific data of activity type being measured from the second device; and
transmitting a second response message including the specific data to the second device in response to the second request message,
wherein the activity information includes activity type indicating type of body activity of a user and measured data type information.

10. The method of claim 9, further comprising:
receiving a control message requesting a specific operation from the second device; and
performing a specific operation based on the control message,
wherein the specific operation is one of activation of measurement operation of the specific activity, deactivation, reset of measured data, download of measured data, change of the specific activity, change of measured data, or change of transmission period.

11. The method of claim 9, further comprising:
receiving a connection request message from the second device based on the advertising message; and
establishing a Bluetooth LE connection with the second device.

12. The method of claim 9, wherein the data type information includes at least one of speed information, calorie information, time information, distance information, or activity number information indicating how many times the activity has been performed.

13. A first device transmitting and receiving activity data of a user through Bluetooth LE (Low Energy) in a wireless communication system, a device comprising:
a communication unit for communicating with the outside in a wireless or wired manner; and
a processor functionally connected to the communication unit, wherein the processor is configured to,
transmit an advertising message indicating support of a measurement service for a user's activity to a second device,
receive a first request message requesting measurement of a specific activity of the user from the second device,
transmit a first response message to the second device in response to the first request message, when the specific activity is supported by the first device, and
measure the specific activity,
wherein the first request message includes activity type indicating type of the specific activity.

* * * * *